(12) United States Patent
Tanaka et al.

(10) Patent No.: US 11,294,177 B2
(45) Date of Patent: Apr. 5, 2022

(54) HEAD-UP DISPLAY SYSTEM

(71) Applicant: NIPPON KAYAKU KABUSHIKI KAISHA, Tokyo (JP)

(72) Inventors: Kouichi Tanaka, Tokyo (JP); Tomoyuki Hayasaki, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 275 days.

(21) Appl. No.: 16/564,605

(22) Filed: Sep. 9, 2019

(65) Prior Publication Data
US 2019/0391390 A1    Dec. 26, 2019

Related U.S. Application Data

(63) Continuation of application No. PCT/JP2018/009365, filed on Mar. 12, 2018.

(30) Foreign Application Priority Data

Mar. 13, 2017 (JP) .............................. JP2017-047784
Mar. 13, 2017 (JP) .............................. JP2017-047785

(51) Int. Cl.
    *G02B 27/01*    (2006.01)
    *G02B 5/30*    (2006.01)
    *B60K 35/00*    (2006.01)

(52) U.S. Cl.
    CPC ....... *G02B 27/0101* (2013.01); *G02B 5/3016* (2013.01); *B60K 35/00* (2013.01);
(Continued)

(58) Field of Classification Search
CPC .. G02B 5/3083; G02B 27/286; G02B 5/3025; G02B 1/04; G02B 30/25; G02B 1/08;
(Continued)

(56) References Cited

U.S. PATENT DOCUMENTS 6,565,974 B1    5/2003   Uchiyama et al.
2004/0263736 A1   12/2004  Graham et al.
(Continued)

FOREIGN PATENT DOCUMENTS

CN    101151568 A    3/2008
CN    102798921 A    11/2012
(Continued)

OTHER PUBLICATIONS

International Preliminary Report on Patentability for corresponding International Application No. PCT/JP2018/009365 dated Sep. 19, 2019.
(Continued)

*Primary Examiner* — Collin X Beatty
*Assistant Examiner* — Grant A Gagnon
(74) *Attorney, Agent, or Firm* — Pearne & Gordon LLP

(57) ABSTRACT

A head-up display system including an optical laminate having at least one substrate material and a half-wave plate, and a display unit that makes display light representing a display image into S-polarized light or P-polarized light and emits the S-polarized light or the P-polarized light. In the head-up display system, an angle formed by a polarization axis of the S-polarized light or the P-polarized light incident from a position inclined at not less than 45° and not more than 65° with respect to an axis perpendicular to a surface of the optical laminate and a slow axis of the half-wave plate is not less than 35° and not more than 44°.

12 Claims, 7 Drawing Sheets

(52) U.S. Cl.
CPC ............... *B60K 2370/1529* (2019.05); *G02B 2027/0118* (2013.01)

(58) Field of Classification Search
CPC .... G02B 27/28; G02B 5/3016; G02B 5/3058; G02B 27/281; G02B 5/3041; G02B 1/02; G02B 5/1809; G02B 5/3075; G02B 21/0092; G02B 5/30; G02B 1/06; G02B 1/115; G02B 1/14; G02B 26/105; G02B 27/283; G02B 27/288; G02B 27/48; G02B 30/27; G02B 5/00; G02B 5/3033; G02B 5/3066; G02B 5/32; G02B 6/305; G02B 6/32; G02B 6/34; G02B 6/4208; G02B 6/4214; G02B 6/43; G02B 13/001; G02B 13/0045; G02B 13/143; G02B 17/08; G02B 17/0892; G02B 19/0028; G02B 19/0033; G02B 1/041; G02B 1/10; G02B 1/11; G02B 1/12; G02B 2027/012; G02B 2027/0194; G02B 21/0016; G02B 21/0032; G02B 21/0056; G02B 21/0068; G02B 21/14; G02B 2207/117; G02B 23/00; G02B 23/12; G02B 26/001; G02B 26/008; G02B 27/0018; G02B 27/0025; G02B 27/0101; G02B 27/0927; G02B 27/095; G02B 27/0977; G02B 27/0988; G02B 27/1006; G02B 27/1033; G02B 27/108; G02B 27/141; G02B 27/285; G02B 27/642; G02B 3/0056; G02B 5/003; G02B 5/008; G02B 5/0252; G02B 5/0263; G02B 5/0278; G02B 5/04; G02B 5/18; G02B 5/201; G02B 5/28; G02B 5/284; G02B 5/285; G02B 5/287; G02B 5/288; G02B 5/3008; G02B 5/305; G02B 6/2713; G02B 6/272; G02B 6/2726; G02B 6/276; G02B 6/2766; G02B 6/4246; G02B 7/008; G02B 9/34; B60K 2370/1529; B60K 35/00

USPC ........................................................ 359/489
See application file for complete search history.

(56) References Cited

U.S. PATENT DOCUMENTS

| | | |
|---|---|---|
| 2006/0209239 A1 | 9/2006 | Lin |
| 2009/0237789 A1 | 9/2009 | Ono et al. |
| 2015/0016768 A1 | 1/2015 | Yamazaki |
| 2015/0179984 A1 | 6/2015 | Yang et al. |
| 2016/0377781 A1 | 12/2016 | Park et al. |
| 2017/0192231 A1 | 7/2017 | Ichihashi et al. |
| 2019/0004227 A1 | 1/2019 | Park et al. |

FOREIGN PATENT DOCUMENTS

| | | |
|---|---|---|
| CN | 103336326 A | 10/2013 |
| CN | 104169762 A | 11/2014 |
| CN | 105765425 A | 7/2016 |
| JP | 6-040271 A | 2/1994 |
| JP | 10-96874 A | 4/1998 |
| JP | 2002-090743 A | 3/2002 |
| JP | 3325560 B2 | 9/2002 |
| JP | 2003-315556 A | 11/2003 |
| JP | 2004-029824 A | 1/2004 |
| JP | 4186981 B | 1/2007 |
| JP | 5375644 B2 | 12/2013 |
| JP | 2017-504079 A | 2/2017 |
| WO | 2006/107006 A1 | 10/2006 |
| WO | 2016/052367 A1 | 4/2016 |

OTHER PUBLICATIONS

First Office Action dated Apr. 23, 2021 for corresponding Chinese Application No. 201880016785.8 and English translation.
International Search Report for corresponding International Application No. PCT/JP2018/009365 dated Apr. 24, 2018.
Written Opinion for corresponding International Application No. PCT/JP2018/009365 dated Apr. 24, 2018.
Second Office Action dated Nov. 18, 2021 for corresponding Chinese Application No. 201880016785.8 and English translation.

HEAD-UP DISPLAY SYSTEM

CROSS REFERENCE TO RELATED APPLICATIONS

This is a continuation application of International Patent Application No. PCT/JP2018/009365 filed Mar. 12, 2018, which claims the benefit of Japanese Patent Application Nos. 2017-047784 and 2017-047785 filed Mar. 13, 2017, respectively, and the full contents of all of which are hereby incorporated by reference in their entirety.

BACKGROUND

Technical Field

The present disclosure relates to a head-up display system for projecting a display image projected from a display unit on a display of glass or the like as a virtual image.

Description of the Related Art

As a method for displaying information to a driver of an automobile, an aircraft or the like, a navigation system, a head-up display (hereinafter, also referred to as a HUD) and the like are used. The HUD system is a system for projecting a display image projected from image projecting units such as a liquid crystal display unit (hereinafter, referred to as an LCD) on a windshield for an automobile or the like, for example.

Display light projected from image displaying units is reflected by a reflection mirror and is further reflected by the windshield and then, reaches an observer. The observer sees a display image projected on the windshield, but the display image looks as if it is at an image position farther than the windshield as a virtual image. In this method, since the driver can obtain various types of information while rarely moving the visual line in a state of gazing toward a front of the windshield, it is safer than a conventional car navigation which requires the visual line to be moved.

In the HUD system, display information is projected while superimposed on a scene actually seen from the windshield, but the display light is reflected by two surfaces on the interior side and the exterior side of the windshield. Therefore, there has been a problem that a reflected image becomes a double image and thus the display information is difficult to see.

With respect to this problem, it has been known that a rotatory polarizer capable of changing the polarization direction by 90° is used for a windshield for an automobile, whereby the problem that the reflected image becomes a double image can be ameliorated. For example, Patent Literature 1 discloses that when display light of S-polarized light is incident at Brewster's angle onto the windshield for an automobile having a film-like rotatory polarizer inside the windshield, a part of the S-polarized light is reflected by a surface of the windshield on the interior side of the automobile, the S-polarized light transmitted through the surface is converted to P-polarized light by the rotatory polarizer, and further all the P-polarized light is emitted to the outside of the automobile by a surface of the windshield on the exterior side of the automobile, thereby preventing a double image. Patent Literature 1 also discloses that when display light of P-polarized light is incident at Brewster's angle onto the windshield for an automobile, P-polarized light which is prevented from being reflected by the surface of the windshield on the interior side of the automobile and is transmitted through the surface is converted to S-polarized light by the rotatory polarizer, all of the S-polarized light is reflected by the surface of the windshield on the exterior side of the automobile, and the S-polarized light is converted to P-polarized light again by the rotatory polarizer, thereby preventing a double image.

By the way, it is desirable that HUD has excellent polarization axis conversion performance capable of more efficiently converting P-polarized light or S-polarized light entering the windshield into S-polarized light or P-polarized light, respectively. Japanese Patent Application Publication No. H6-40271 does not mention the polarization axis conversion performance of the rotatory polarizer.

SUMMARY

The present disclosure is related to providing a head-up display system that exhibits excellent polarization axis conversion performance while suppressing occurrence of double images.

According to an aspect of the present disclosure, a head-up display system includes an optical laminate having at least one substrate material and a half-wave plate, and a display unit that makes display light representing a display image into S-polarized light or P-polarized light and emits the S-polarized light or the P-polarized light. In the head-up display system, an angle formed by a polarization axis of the S-polarized light or the P-polarized light incident from a position inclined at not less than 45° and not more than 65° with respect to an axis orthogonal to a surface of the optical laminate and a slow axis of the half-wave plate is not less than 35° and not more than 44°.

Further, it is preferable that an angle θ formed by the slow axis of the half-wave plate and a polarization axis of S-polarized light or P-polarized light incident onto the optical laminate at arbitrary incident angle satisfies the following equations (2) and (3):

$$\tan\theta = \cos\beta \tag{2}$$

$$\beta = \sin^{-1}\left(\sin\alpha \cdot \frac{n_\alpha}{n_\beta}\right) \tag{3}$$

θ: an angle formed by the slow axis of the half-wave plate and the polarization axis of S-polarized light or P-polarized light incident to the optical laminate at arbitrary incident angle α

α: an incident angle of S-polarized light or P-polarized light to the optical laminate $n_\alpha$: refractive index of air $n_\beta$: refractive index of the half-wave plate.

Further, it is preferable that the half-wave plate has a phase difference layer formed by laminating a ¾-wave plate and a quarter-wave plate so that the slow axes of the ¾-wave plate and the quarter-wave plate intersect with each other.

Further, it is preferable that the half-wave plate has a block layer on a side where a phase difference layer having a function of converting a polarization axis is present.

Further, it is preferable that the block layer is a cured film obtained by curing an ultraviolet curable resin composition, a thermosetting resin composition, or a mixture thereof.

Further, it is preferable that the ultraviolet curable resin composition contains one or more kinds of ultraviolet curable resin selected from the group consisting of polyfunctional (meth)acrylate, polyfunctional urethane (meth)acrylate, polyfunctional epoxy (meth)acrylate, polyfunctional polyester (meth)acrylate and polyfunctional tris (acryloxyethyl)isocyanurate.

Further, it is preferable that an incident angle of the P-polarized light incident to the optical laminate is within a range from not less than α−10° to not more than α+10°, where α represents a Brewster's angle of the P-polarized light with respect to the optical laminate.

Further, it is preferable that the optical laminate has an intermediate laminate in which the half-wave plate is sandwiched by two intermediate films, and the intermediate laminate is sandwiched by two substrate materials.

Further, it is preferable that at least one intermediate film of the two intermediate films is a film which is directly laminated on the substrate material in advance.

Further, it is preferable that the substrate material is glass.

Further, it is preferable that the half-wave plate includes a polymerizable liquid crystal layer.

Further, it is preferable that the polymerizable liquid crystal layer is provided on a support substrate that is subjected to orientation processing.

The present disclosure can provide a head-up display system that exhibits excellent polarization axis conversion performance while suppressing occurrence of double images.

DETAILED DESCRIPTION

[Head-Up Display System]

Hereinafter, embodiments of the present disclosure will be described with reference to the drawings. Note that the following embodiments merely exemplify some representative embodiments of the present disclosure, and various modifications can be made within the scope of the present disclosure. Also, a (meth)acryloyl group described later represents an acryloyl group or a methacryloyl group, which means that they are independently present in the molecule, and (meth)acrylate means acrylate or methacrylate.

Figure 1:
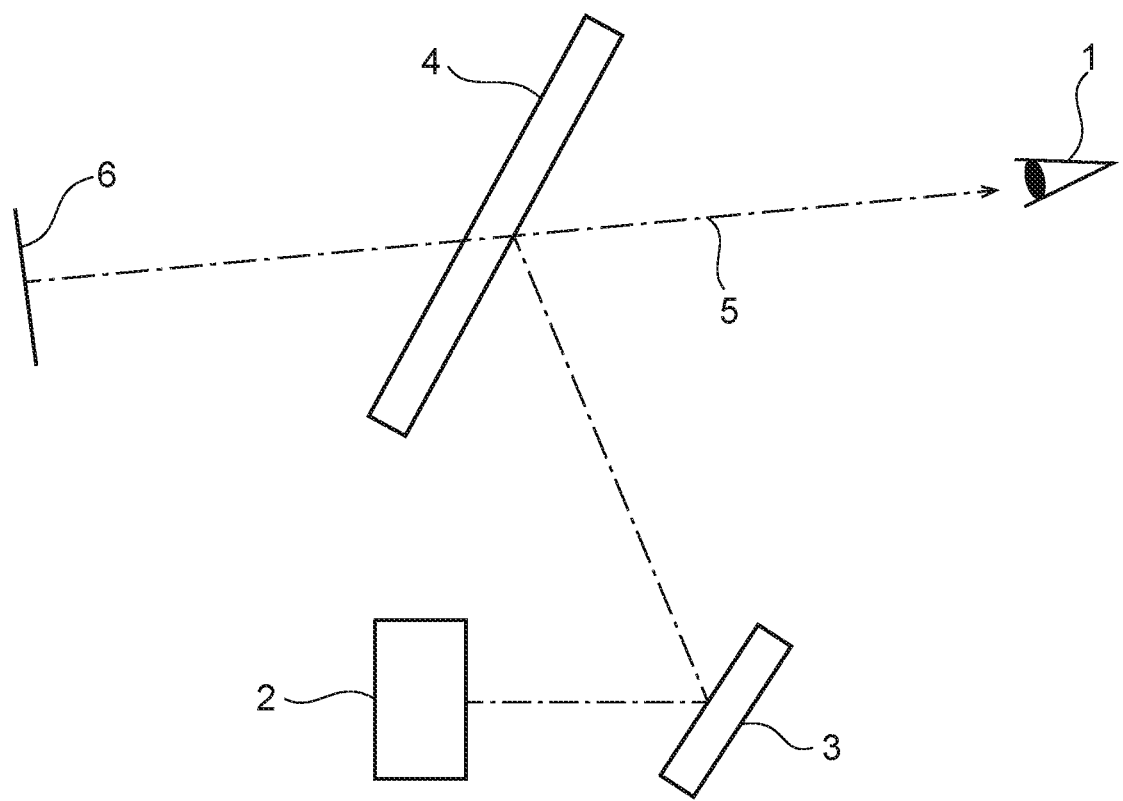
FIG. 1 is a schematic diagram showing an embodiment of a head-up display system according to the present disclosure.

FIG. 1 is a schematic diagram of a HUD system of the present disclosure. The HUD system shown in FIG. 1 includes a display unit 2 for emitting display light representing a display image in the form of P-polarized light, a reflecting mirror 3 for reflecting the display light emitted from the display unit 2, and an optical laminate 4 to which S-polarized light or P-polarized light emitted from the display unit 2 is incident. By reflecting the S-polarized light or the P-polarized light emitted from the display unit 2 by the reflecting mirror 3 and irradiating the optical laminate 4 with the reflected display light, the S-polarized light or the P-polarized light reaches an observer 1 through an optical path 5, and a virtual image 6 of the display image can be visually recognized. Note that in the HUD system shown in FIG. 1, the display light emitted from the display unit 2 is incident to the optical laminate 4 through the reflecting mirror 3, but it may be directly incident to the optical laminate 4 from the display 2.

<Display Unit>

Figure 2:
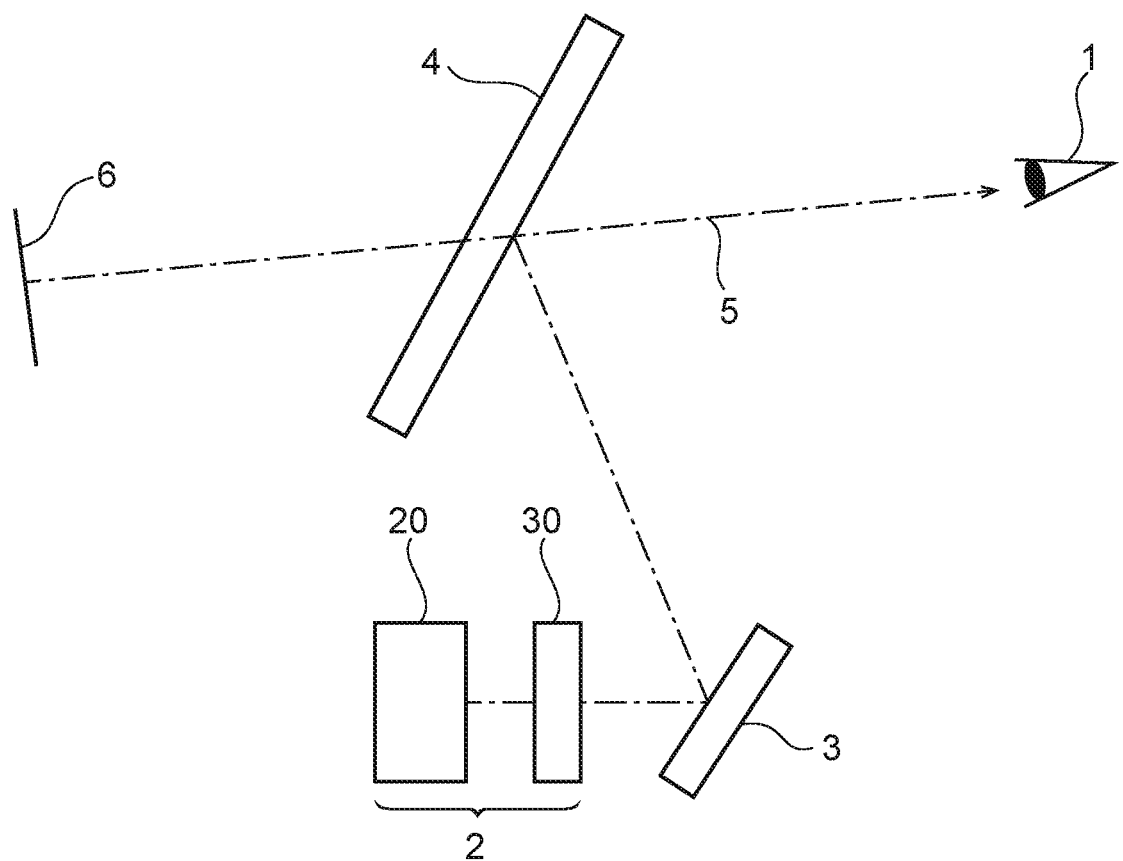
FIG. 2 is a schematic diagram showing another embodiment of the head-up display system according to the present disclosure.

The display unit 2 to be used in the HUD system of the present disclosure is not particularly limited as long as it can emit desired S-polarized light or P-polarized light before the desired S-polarized light or P-polarized light has finally reached the optical laminate 4, but for example, a liquid crystal display (LCD) such as a liquid crystal projector, an organic EL display (OELD) and the like may be cited. When the display unit 2 is a liquid crystal display device, emitted light is usually linearly polarized light, and thus the emitted light can be used as it is. On the other hand, when the display unit 2 is an organic EL display, for example, the display unit 2 may be configured by a light source 20 and a polarization plate 30 capable of emitting S-polarized light or P-polarized light as shown in FIG. 2. When the HUD system is used in an automobile, the liquid crystal display device and the organic EL display may be adjusted so that, for example, an optical member such as a polarization plate or a half-wave plate may be arranged at a light emission port such as a dashboard and S-polarized light or P-polarized light can be emitted from the display unit 2. Moreover, a light source to be used for the display unit 2 is also not particularly limited, and a laser light source, an LED light source, etc. can be used. By setting the central reflection wavelength of the half-wave plate described later so that the central reflection wavelength corresponds to an emission spectrum of the light source, the display image can be clearly displayed more effectively.

<Optical Laminate>

Figure 3:
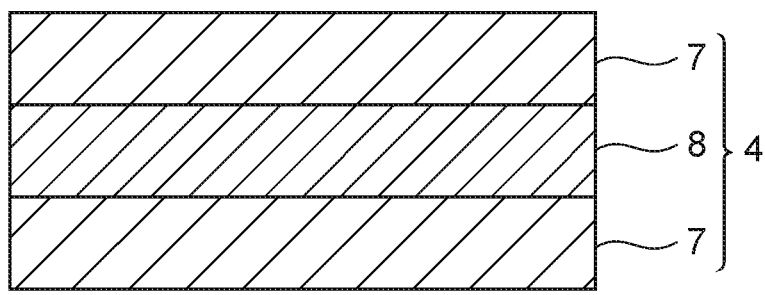
FIG. 3 is a side cross-sectional view showing an embodiment of an optical laminate to be used in the present disclosure.
Figure 4:
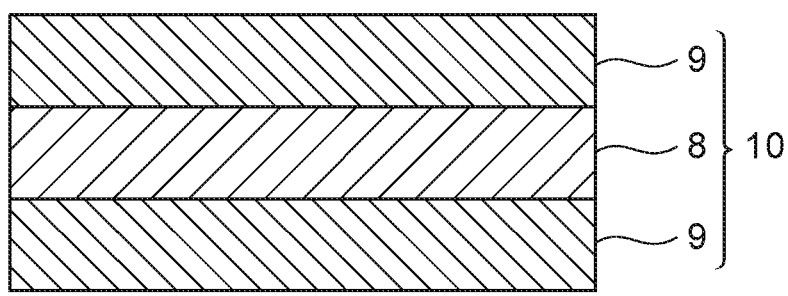
FIG. 4 is a side cross-sectional view showing an embodiment of an intermediate laminate to be used in the present disclosure.
Figure 5:
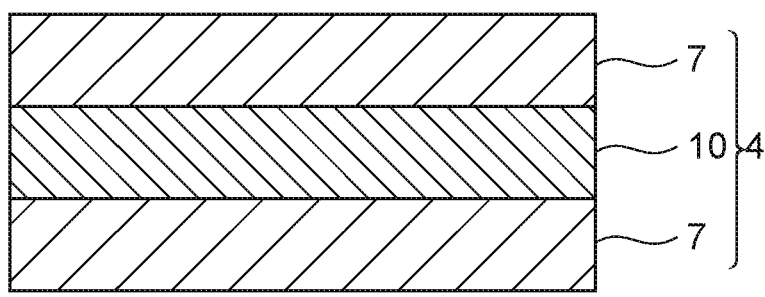
FIG. 5 is a side cross-sectional view showing an embodiment of an optical laminate including the intermediate laminate shown in FIG. 4.

The optical laminate to be used in the present disclosure has at least one substrate material and a half-wave plate. Such an optical laminate may have a substrate material on one side or both sides of the half-wave plate. FIG. 3 shows an embodiment of the optical laminate to be used in the present disclosure. An optical laminate 4 shown in FIG. 3 has a configuration in which a half-wave plate 8 and two substrate materials 7 are provided, and the half-wave plate 8 is sandwiched by the two substrate materials 7. As shown in FIGS. 4 and 5, the optical laminate 4 may have a configuration in which it has an intermediate laminate 10 that the half-wave plate 8 is sandwiched by two intermediate films 9, and this intermediate laminate 10 is sandwiched by the two substrate materials 7. The optical laminate 4 to be used in the present disclosure can be obtained by bonding the substrate material 7 onto one side or both sides of the half-wave plate 8 or onto one side or both sides of the intermediate laminate 10 in which the intermediate film 9 is laminated on one side or both sides of the half-wave plate 8. The optical laminate can be obtained, for example, by press-fitting the substrate material onto one side or both sides of the half-wave plate at high temperature and high pressure. As shown in FIG. 5, when the optical laminate 4 has the intermediate laminate 10, the intermediate film 9 also has a function as a pressure-sensitive adhesive or adhesive for maintaining the adhesion between the substrate material 7 and the half-wave plate 8.

(Substrate Material)

In order to maintain visibility of display images, it is preferable that the substrate material to be used in the present disclosure is transparent in the visible light region. Specifically, the visible light transmittance at wavelengths of 380 to 780 nm may be 50% or more, it is preferable that the visible light transmittance at wavelengths of 380 to 780 nm is 70% or more, and it is more preferable that the visible light transmittance at wavelengths of 380 to 780 nm is 85% or more. The substrate material may be colored, but it is preferable that the substrate material is not colored or less colored. It is preferable that the refractive index of the substrate material is 1.2 to 2.0, and it is more preferable that the refractive index of the substrate material is 1.4 to 1.8. The thickness of the substrate material is not particularly limited as long as it does not affect the reflection of display light, and can be appropriately designed according to an application.

The substrate material may be a single layer or a laminate of two or more layers. Examples of the material of the substrate material may include glass, triacetyl cellulose (TAC), acrylic, polycarbonate, polyvinyl chloride, polyolefin, polyethylene terephthalate (PET) and the like. Among these materials, in order not to change the polarization axis of incident light, glass having less birefringence, triacetyl cellulose (TAC), polyolefin, acrylic, etc. are preferable, and glass is more preferable. Furthermore, a reflection enhancing film made of a multi-layered film or a metal thin-film layer serving also as a thermal insulating function may be provided on a reflection surface in these substrate materials. These films can improve the reflectance of the incident polarized light, but when the optical laminate is used as a windshield for an automobile, it is preferable to adjust the reflectance so that the visible light transmittance of the optical laminate becomes 70% or more. Furthermore, the shape of the substrate material is also not particularly limited, and can be appropriately designed according to applications such as a sheet type, a film type, a plate type, and a curved surface shape type. For example, when a glass plate is used as the substrate material as in the case of a windshield for an automobile, as a method of bonding the half-wave plate or the intermediate laminate to the glass plate, a pressure-sensitive adhesive or an adhesive bond is coated on one side or both sides of the half-wave plate or the intermediate laminate, and then the glass plate is bonded. The pressure-sensitive adhesive and the adhesive bond are not particularly limited, but when there is a case where the glass plate is to be peeled off later, a material having adhesiveness with excellent reworkability is preferable, and for example, a silicone pressure-sensitive adhesive or an acrylic pressure-sensitive adhesive is preferable.

(Half-Wave Plate)

The half-wave plate is a phase difference element including a phase difference layer having a function of converting P-polarized light to S-polarized light or S-polarized light to P-polarized light, that is, a function of converting a polarization axis. The phase difference value representing the degree of the phase changes according to the wavelength, and for example, the phase difference value of the half-wave plate for polarized light of 550 nm in wavelength is 275 nm. In the phase difference element used in the present disclosure, since polarized light is diagonally incident, it is also necessary to consider the change of the phase difference value according to the incident angle. Although the degree of the change varies depending on the phase difference element to be used, it is preferable that the phase difference value as the phase difference element to be used in the present disclosure is in a range of a theoretical phase difference value in the normal direction of the phase difference element (hereinafter referred to as "theoretical value") ±30 nm, it is more preferable that the phase difference value is in a range of the theoretical value ±25 nm, and it is still more preferable that the phase difference value is in a range of the theoretical value ±20 nm. For example, in the case of the phase difference element (half-wave plate) to be used in the present disclosure, it is preferable that the phase difference value of the phase difference element for polarized light having a wavelength of 550 nm is in a range of 245 to 305 nm, it is more preferable that the phase difference value is in a range of 250 to 300 nm, and it is still more preferable that the phase difference value is in a range of 255 to 295 nm. Such a phase difference element can be obtained, for example, by uniaxially stretching a film made of polycarbonate or cycloolefin polymer so that the phase difference thereof is equal to half of the wavelength or by orientating horizontally orientable polymerizable liquid crystal at such a thickness that the phase difference is equal to half of the wavelength. A half-wave plate including a horizontally orientable polymerizable liquid crystal layer generally has a polymerizable liquid crystal layer as a phase difference layer having a function of converting a polarization axis, and a support substrate which is coated with a coating liquid for forming the polymerizable liquid crystal layer and supports the phase difference layer. From the viewpoint of the orientation of the liquid crystal, it is preferable that an upper limit value of the thickness of the phase difference layer of such a half-wave plate is 10 μm or less, and it is more preferable that the upper limit value is m or less. On the other hand, from the viewpoint of the polymerizability of the liquid crystal, it is preferable that a lower limit value of the thickness of the phase difference layer of the half-wave plate is 0.3 μm or more, and it is more preferable that the lower limit value is 0.5 μm or more. When light is incident from a diagonal position to a main surface of the half-wave plate as described above, the phase difference is made to be more strictly matched in the case where the phase difference changes according to the incident angle of light. Therefore, for example, by using a phase difference element whose refractive index has been adjusted, the change of the phase difference depending on the incident angle can be suppressed. For example, when the refractive index in the slow axis direction in a plane of the phase difference element is nx, the refractive index in a direction orthogonal to nx within the plane of the phase difference element is ny, and the refractive index in the thickness direction of the phase difference element is nz, control is performed such that a coefficient Nz represented by the following equation (1) is preferably 0.3 to 1.0, more preferably 0.5 to 0.8.

$$Nz = (nx - nz)/(nx - ny) \tag{1}$$

Figure 6:
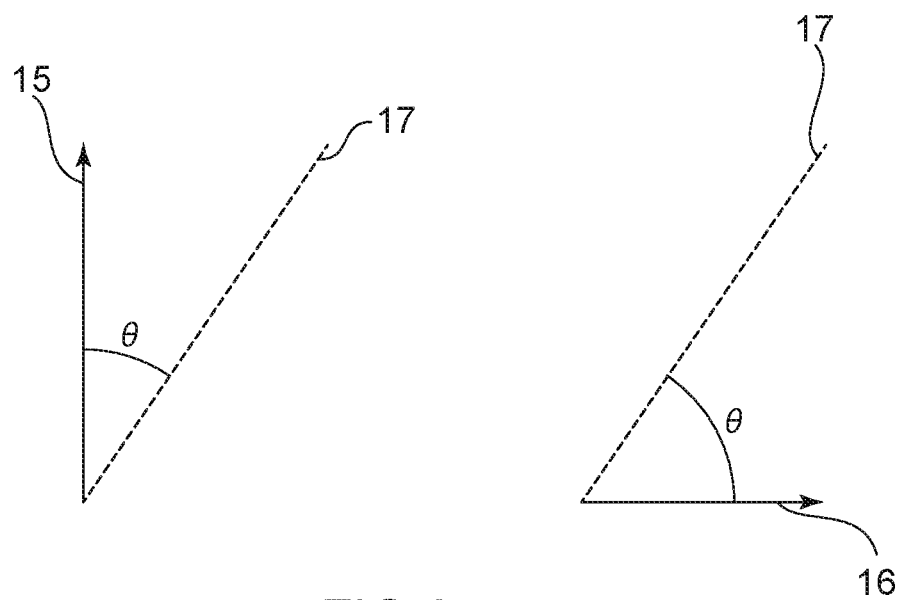
FIG. 6 is a simplified diagram showing an angle θ formed by the slow axis of a half-wave plate and the polarization axis of S-polarized light or P-polarized light incident to the optical laminate at arbitrary incident angle.

In the HUD system of the present disclosure, in order to efficiently convert P-polarized light to S-polarized light or S-polarized light to P-polarized light, as shown in FIG. 6, an angle θ formed by the slow axis 17 of the half-wave plate and the polarization axis 15 of P-polarized light or the polarization axis 16 of S-polarized light, which is incident from a position inclined by not less than 45° and not more than 65°, preferably by not less than 50° and not more than 60° with respect to an axis perpendicular to the surface of the optical laminate, is controlled to be in a range of not less than 35° and not more than 44°. By setting the incident angle of S-polarized light or P-polarized light incident to the half-wave plate in the range of not less than 45° to not more than 65°, the reflectance at the surface of the optical laminate can be theoretically suppressed to 2% or less when P-polarized light is incident to the optical laminate. The transmitted P-polarized light is converted to S-polarized light by the half-wave plate, and the converted S-polarized light is reflected at the interface between the air and the optical laminate on an opposite side to the incidence side. The reflected S-polarized light is converted to P-polarized light again by the half-wave plate, and this P-polarized light reaches an observer. Even when S-polarized light is incident to the optical laminate, the S-polarized light is reflected at the surface of the optical laminate, and this S-polarized light reaches the observer. The transmitted S-polarized light is converted to P-polarized light by the half-wave plate, and the converted S-polarized light is not reflected at the interface between the air and the optical laminate on the opposite side to the incidence side, but transmits therethrough. As described above, by controlling the incident angle of S-polarized light or P-polarized light incident to the optical laminate in the range from not less than 45° to not more than 65°, overlapping of S-polarized light or P-polarized light reaching the observer is prevented, so that occurrence of a double image can be suppressed. When the angle θ is less than 35° or larger than 44°, the polarization axis conversion performance for converting P-polarized light incident to the optical laminate to S-polarized light or converting S-polarized light to P-polarized light is low, so that a display image on the display also becomes dark. Therefore, by appropriately controlling this angle θ, the half-wave plate exhibits excellent polarization axis conversion performance, and as a result, the display image can be visually recognized remarkably clearly.

In order to further enhance the conversion performance of the polarization axis exhibited by the half-wave plate, it is preferable that the angle θ is a value calculated from the following equations (2) and (3). Here, technical significance of the following equations (2) and (3) will be described. When S-polarized light or P-polarized light incident to the optical laminate passes through a half-wave plate which is a medium having a refractive index different from air, the incident angle of the S-polarized light or P-polarized light incident to the half-wave plate changes. Here, when the incident angle of the S-polarized light or the P-polarized light to the optical laminate is c, the incident angle of the S-polarized light or P-polarized light which is actually incident to the half-wave plate, that is, the refractive angle of the half-wave plate is β, the refractive index of air is $n_\alpha$, and the refractive index of the half-wave plate is $n_\beta$, sin α/sin β=$n_\beta$/$n_\alpha$ is satisfied according to the Snell's law, and when this equation is simplified into an equation for determining β, an equation (3) is derived. Furthermore, in case a phase difference value is Re when the polarization axis of S-polarized light incident to the optical laminate is x-axis, the polarization axis of P-polarized light is y-axis and the angle between the y-axis and the slow axis of the half-wave plate is θ, vectorial analysis provides that the y-axis is represented by Re·cos θ and the x-axis is represented by Re·sin θ. Here, since it is known that the polarization axis conversion performance of the half-wave plate is maximized when light is incident at 45° with respect to the slow axis of the half-wave plate, it is theoretically desirable that the incident angle to the slow axis of the half-wave plate is 45°. However, as described above, even when the incident angle of S-polarized light or P-polarized light incident on the optical laminate is θ, the incident angle to the half-wave plate is actually β. Therefore, when the y-axis (actual y-axis) is determined in the case where the y-axis (theoretical y-axis) of Re·cos θ is inclined by an angle β about the x-axis, Re·cos θ/the actual y-axis=Sin (90°−β) is satisfied, and the actual y-axis is represented by Re·cos θ cos β. As described above, it is desirable that the incident angle to the slow axis of the half-wave plate is 45°. In order to set the angle formed by the polarization axis of S-polarized light or P-polarized light incident on the optical laminate and the slow axis of the half-wave plate to 45°, it is necessary to make the x-axis (Re·sin θ) and the actual y-axis (Re·cos θ cos β) equal to each other. As a result, Re·sin θ=Re·cos θ cos β is obtained, and the equation (2) is derived by simplifying the above equation. Thus, based on the values calculated from the following equations (2) and (3), by strictly controlling the angle θ in relation to the actually incident angle β to the half-wave plate, it is possible to make the most of the polarization axis conversion performance exhibited by the half-wave plate.

$$\tan\theta = \cos\beta \qquad (2)$$

$$\beta = \sin^{-1}\left(\sin\alpha \cdot \frac{n_\alpha}{n_\beta}\right) \qquad (3)$$

θ: an angle formed by the slow axis of the half-wave plate and the polarization axis of S-polarized light or P-polarized light incident to the optical laminate at arbitrary incident angle α

α: an incident angle of S-polarized light or P-polarized light to the optical laminate $n_\alpha$: refractive index of air $n_\beta$: refractive index of the half-wave plate It is preferable that the range of the angle θ is controlled to be in a range of ±70 of the value of the angle θ, it is more preferable that the range of the angle θ is controlled to be in a range of +5°, it is still more preferable that the range of the angle θ is controlled to be in a range of ±20, and it is particularly preferable that the range of the angle θ is controlled to be in a range of ±10. If the angle θ is out of the range of ±50 of the angle satisfying the values calculated from the following equations (2) and (3), the conversion efficiency of the polarization axis from P-polarized light to S-polarized light exhibited by the half-wave plate tends to deteriorate. By strictly controlling the range of the angle θ based on the values calculated from the equations (2) and (3), it is possible to suppress reduction of the conversion efficiency of the polarization axis from P-polarized light to S-polarized light by the half-wave plate, and enhance more the polarization axis conversion performance exhibited by the half-wave plate.

With respect to the refractive index of the half-wave plate to be substituted into the equation (3), the refractive index in the slow axis direction of the half-wave plate is nx, the refractive index in a direction orthogonal to nx within the plane of the half-wave plate is ny, and the refractive index in the thickness direction of the half-wave plate is nz, and a value obtained by averaging the sum of these indexes is used as an average refractive index. When a commercially available half-wave plate is used, a value listed in a catalog or the like may be used as the average refractive index. In the case where polymerizable liquid crystal described later is used as the material of the half-wave plate, the average refractive index is represented by (nx+ny+nz)/3=(no+ne)/2 when ordinary light refractive index no and extraordinary light refractive index ne of the original liquid crystal are used.

As a specific example of θ calculated from the equations (2) and (3), for example, when the refractive index of air is 1.00, and a half-wave plate having a refractive index of 1.55 is used and the incident angle of S polarized light or P-polarized light is 45°, the value of θ is equal to 42° based on the equations (2) and (3). Therefore, the range of θ is preferably from not less than 35° to not more than 44°, more preferably from not less than 37° to not more than 44°, still more preferably from not less than 40° to not more and 44°, and particularly preferable from not less than 41° to not more than 43°.

When the incident angle of S-polarized light or P-polarized light is 50°, the value of θ is equal to 41° based on the equations (2) and (3). Therefore, the range of θ is preferably from not less than 35° to not more than 44°, more preferably from not less than 38° to not more than 44°, still more preferably from not less than 39° to not more than 43°, and particularly preferably from not less than 40° to not more than 42°.

When the incident angle of S-polarized light or P-polarized light is 56° or 60°, the value of θ is equal to 40° based on the equations (2) and (3). Therefore, the range of θ is preferably from not less than 35° to not more than 44°, more preferably from not less than 37° to not more than 43°, still more preferably from not less than 38° to not more than 42°, and particularly preferably from not less than 39° to not more than 41°.

When the incident angle of S-polarized light or P-polarized light is 65°, the value of θ is equal to 39° based on the equations (2) and (3). Therefore, the range of θ is preferably from not less than 35° to not more than 44°, more preferably from not less than 36° to not more than 42°, still more preferably from not less than 37° to not more than 41°, and particularly preferably from not less than 38° to not more than 40°.

When glass having a refractive index of 1.48 is used as the substrate material and P-polarized light is incident to the substrate material at the Brewster's angle (about 56°), the value of θ is equal to 40° based on the equations (2) and (3), and the range of θ is preferably from not less than 35° to not more than 44°, more preferably from not less than 37° to not more than 43°, still more preferably from not less than 38° to not more than 42°, and particularly preferably from not less than 39° to not more than 41°.

(Phase Difference Layer)

As described above, in the present disclosure, by strictly controlling the angle θ formed by the polarization axis of S-polarized light or P-polarized light incident on the optical laminate and the slow axis of the half-wave plate, the polarization axis conversion performance exhibited by the half-wave plate can be more enhanced. In such a case, from the viewpoint of the controllability of the slow axis of the half-wave plate and the production cost, it is particularly preferable to use a half-wave plate including a polymerizable liquid crystal layer as the phase difference layer having the function of converting the polarization axis. The phase difference layer means a half-wave phase difference layer for imparting a phase difference of a half wavelength to transmitted light because the phase difference layer has the function of converting P-polarized light to S-polarized light or S-polarized light to P-polarized light.

When the phase difference layer has wavelength dependency, the polarization axis can be more accurately converted by adjusting the phase difference value according to the wavelength of a light source to be used. For example, when the wavelength of the light source is 550 nm, it is preferable that the phase difference value of the phase difference layer is 275 nm, when the wavelength of the light source is 450 nm, it is preferable that the phase difference value of the phase difference layer is 225 nm, and when the wavelength of the light source is 650 nm, it is preferable that the phase difference value of the phase difference layer is 325 nm. For example, when a white light source or the like including plural wavelengths is used in order to support full color display, as a method of providing substantially uniform phase difference to all the wavelengths, for example, a method of using a half-wave plate on which a phase difference layer having so-called reverse wavelength dispersibility is formed as described in Japanese Patent No. 3,325,560, Japanese Patent No. 4,186,981 and Japanese Patent No. 5,375,644, and a method of using a phase difference layer in which a ¾-wave plate and a quarter-wave plate having similar wavelength dependency are laminated so that the slow axes thereof cross each other are preferable. In the latter method, it is particularly preferable to use a phase difference layer in which the ¾-wave plate and the quarter-wave plate having the same wavelength dispersibility are laminated so that the slow axes thereof cross each other when the ¾-wave plate and the quarter-wave plate are viewed from an angle at which light from the light source is incident. By using such a phase difference layer, for example, even when a white light source is used for full color display, etc., it is possible to accurately perform the polarization axis conversion from S-polarized light of each wavelength contained in the white light source to P-polarized light or from P-polarized light of each wavelength to S-polarized light, so that occurrence of double images can be further suppressed. Note that the ¾-wave plate means a phase difference element having a ¾-wave phase difference layer for imparting a phase difference of ¾ wavelength to transmitted light, and the quarter-wave plate means a phase difference element having a quarter-wave phase difference layer for imparting a phase difference of quarter wavelength to transmitted light.

In the case where the ¾-wave plate and the quarter-wave plate are made to cross each other, it is preferable to make the slow axes thereof orthogonal to each other when the incident angle of S-polarized light or P-polarized light from the light source is perpendicular from the front, that is, the incident angle is 0°. On the other hand, for example, when the refractive index of air is 1.00, the quarter-wave plate and the ¾-wave plate are used so that the refractive index becomes 1.55 and the incident angle of S-polarized light or P-polarized light is 45°, the value of θ is equal to 42° based on the equations (2) and (3). Therefore, with respect to the range of θ, the ¾-wave plate and the quarter-wave plate are made to cross each other preferably so that the slow axis of the ¾-wave plate or the quarter-wave plate is not less than 35° and not more than 44°, and the slow axis of the other plate of the quarter-wave plate or the ¾-wave plate is not less than −44° and not more than −35°, more preferably so that the slow axis of the ¾-wave plate or the quarter-wave plate is not less than 37° and not more than 44°, and the slow axis of the other plate of the quarter-wave plate or the ¾-wave plate is not less than −44° and not more than −37°, still more preferably so that the slow axis of the ¾-wave plate or the quarter-wave plate is not less than 40° and not more than 44°, and the slow axis of the other plate of the quarter-wave plate or the ¾-wave plate is not less than −44° and not more than −40°, and particularly preferably so that the slow axis of the ¾-wave plate or the quarter-wave plate is not less than 41° and not more than 43°, and the slow axis of the other plate of the quarter-wave plate or the ¾-wave plate is not less than −42° and not more than −40°.

When the incident angle of S-polarized light or P-polarized light is 50°, the value of θ is equal to 41° based on the equations (2) and (3). Therefore, with respect to the range of θ, the ¾-wave plate and the quarter-wave plate are made to cross each other preferably so that the slow axis of the ¾-wave plate or the quarter-wave plate is not less than 35° and not more than 44°, and the slow axis of the other plate of the quarter-wave plate or the ¾-wave plate is not less than −44° and not more than −35°, more preferably so that the slow axis of the ¾-wave plate or the quarter-wave plate is not less than 38° and not more than 44°, and the slow axis of the other plate of the quarter-wave plate or the ¾-wave plate is not less than −44° and not more than −38°, still more preferably so that the slow axis of the ¾-wave plate or the quarter-wave plate is not less than 39° and not more than 43°, and the slow axis of the other plate of the quarter-wave plate or the ¾-wave plate is not less than −43° and not more than −39°, and particularly preferably so that the slow axis of the ¾-wave plate or the quarter-wave plate is not less than 40° and not more than 42°, and the slow axis of the other plate of the quarter-wave plate or the ¾-wave plate is not less than −42° and not more than −40°.

When the incident angle of S-polarized light or P-polarized light is 56° or 60°, the value of θ is equal to 40° based on the equations (2) and (3). Therefore, with respect to the range of θ, the ¾-wave plate and the quarter-wave plate are made to cross each other preferably so that the slow axis of the ¾-wave plate or the quarter-wave plate is not less than 35° and not more than 44°, and the slow axis of the other plate of the quarter-wave plate or the ¾-wave plate is not less than −44° and not more than −35°, more preferably so that the slow axis of the ¾-wave plate or the quarter-wave plate is not less than 37° and not more than 43°, and the slow axis of the other plate of the quarter-wave plate or the ¾-wave plate is not less than −43° and not more than −37°, still more preferably so that the slow axis of the ¾-wave plate or the quarter-wave plate is not less than 38° and not more than 42°, and the slow axis of the other plate of the quarter-wave plate or the ¾-wave plate is not less than −42° and not more than −38°, and particularly preferably so that the slow axis of the ¾-wave plate or the quarter-wave plate is not less than 39° and not more than 41°, and the slow axis of the other plate of the quarter-wave plate or the ¾-wave plate is not less than −41° and not more than −39°.

When the incident angle of S-polarized light or P-polarized light is 65°, the value of θ is equal to 39° based on the equations (2) and (3). Therefore, with respect to the range of θ, the ¾-wave plate and the quarter-wave plate are made to cross each other preferably so that the slow axis of the ¾-wave plate or the quarter-wave plate is not less than 35° and not more than 44°, and the slow axis of the other plate of the quarter-wave plate or the ¾-wave plate is not less than −44° and not more than −35°, more preferably so that the slow axis of the ¾-wave plate or the quarter-wave plate is not less than 36° and not more than 42°, and the slow axis of the other plate of the quarter-wave plate or the ¾-wave plate is not less than −42° and not more than −36°, still more preferably so that the slow axis of the ¾-wave plate or the quarter-wave plate is not less than 37° and not more than 41°, and the slow axis of the other plate of the quarter-wave plate or the ¾-wave plate is not less than −41° and not more than −37°, and particularly preferably so that the slow axis of the ¾-wave plate or the quarter-wave plate is not less than 38° and not more than 40°, and the slow axis of the other plate of the quarter-wave plate or the ¾-wave plate is not less than −40° and not more than −38°

When glass having a refractive index of 1.48 is used as the substrate material and P-polarized light is incident to the substrate material at the Brewster's angle (about 56°), the value of θ is equal to 40° based on the equations (2) and (3). Therefore, with respect to the range of θ, the ¾-wave plate and the quarter-wave plate are made to cross each other preferably so that the slow axis of the ¾-wave plate or the quarter-wave plate is not less than 35° and not more than 44°, and the slow axis of the other plate of the quarter-wave plate or the ¾-wave plate is not less than −44° and not more than −35°, more preferably so that the slow axis of the ¾-wave plate or the quarter-wave plate is not less than 37° and not more than 43°, and the slow axis of the other plate of the quarter-wave plate or the ¾-wave plate is not less than −43° and not more than −37°, still more preferably so that the slow axis of the ¾-wave plate or the quarter-wave plate is not less than 38° and not more than 42°, and the slow axis of the other plate of the quarter-wave plate or the ¾-wave plate is not less than −42° and not more than −38°, and particularly preferably so that the slow axis of the ¾-wave plate or the quarter-wave plate is not less than 39° and not more than 41°, and the slow axis of the other plate of the quarter-wave plate or the ¾-wave plate is not less than −41° and not more than −39°.

As described above, when the ¾-wave plate and the quarter-wave plate are viewed from the angle at which the light from the light source is incident, the slow axes of the ¾-wave plate and the quarter-wave plate are set to be substantially orthogonal to each other. That is, a phase difference layer formed by laminating a ¾-wave plate and a quarter-wave plate so that the slow axes thereof cross each other becomes substantially a half-wave plate. Furthermore, the phase difference layer in which the ¾-wave plate and the quarter-wave plate are laminated may have a support substrate for supporting the phase difference layer. A support substrate described later which is used for the half-wave plate can be used as the above support substrate. Note that the direction of the slow axis of the laminated phase difference layer can be regarded as the direction of the slow axis of the ¾-wave plate.

The polymerizable liquid crystal is a nematic liquid crystal monomer having a polymerizable group in the molecule and exhibiting liquid crystallinity in a certain temperature range or concentration range. Examples of the polymeric group include a (meth)acryloyl group, a vinyl group, a chalconyl group, a cinnamoyl group, an epoxy group, etc. Furthermore, in order for the polymerizable liquid crystal to exhibit liquid crystallinity, it is preferable that a mesogenic group is present in the molecule, and the mesogenic group means a rod-like or plate-like substituent such as a biphenyl group, a terphenyl group, a (poly)benzoic phenyl ester group, a (poly)ether group, a benzylidene aniline group or acenaphthoquinoxaline group, or a disc-like substituent such as a triphenylene group, a phthalocyanine group or a azacrown group, that is, a group having an ability for inducing a liquid crystal phase behavior. Liquid crystal compounds having rod-like or plate-like substituents are known as calamitic liquid crystals in the art. Examples of the nematic liquid crystal monomer having such a polymerizable group include polymerizable liquid crystals described in Japanese Patent Application Publication No. 2003-315556, Japanese Patent Application Publication No. 2004-29824, etc., and polymerizable liquid crystals such as PALIOCOLOR series (manufactured by the BASF company) and RMM series (manufactured by the Merck company). These nematic liquid crystal monomers having these polymerizable groups may be used alone or used while plural kinds of monomers are mixed.

In addition, a polymerizable compound that can react with the nematic liquid crystal monomer containing a polymerizable group and has no liquid crystallinity may be added. Such a compound is, for example, ultraviolet curable resin. Examples of the ultraviolet curable resin include dipentaerythritol hexa(meth)acrylate, a reaction product of dipentaerythritol penta(meth)acrylate and 1,6-hexamethylene-diisocyanate, a reaction product of isocyanuric-ring-containing tri-isocyanate and pentaerythritol tri(meth) acrylate, a reaction product of pentaerythritol tri(meth) acrylate and isophorone-di-isocyanate, dipentaerythritol penta(meth)acrylate, dipentaerythritol tetra(meth)acrylate, pentaerythritol tetra(meth)acrylate, pentaerythritol tri(meth) acrylate, trimethylolpropane tri(meth)acrylate, ditrimethylolpropane tetra(meth)acrylate, tris (acryloxyethyl)isocyanurate, tris (methacryloxyethyl)isocyanurate, a reaction product of glycerol triglycidyl ether and (meth)acrylic acid, caprolactone denaturation tris (acryloxyethyl)isocyanurate, a reaction product of trimethylolpropane triglycidyl ether and (meth)acrylic acid, triglycerol-di-(meth)acrylate, a reaction product of propylene glycol-di-glycidyl ether and (meth)acrylic acid, polypropylene glycol-di-(meth)acrylate, tripropylene glycol-di-(meth)acrylate, polyethylene glycol-di-(meth)acrylate, tetraethylene glycol-di-(meth)acrylate, triethylene glycol-di-(meth)acrylate, pentaerythritol-di-(meth)acrylate, a reaction product of 1,6-hexanediol-di-glycidyl ether and (meth)acrylic acid, 1,6-hexanediol-di-(meth)acrylate, glycerol-di-(meth)acrylate, a reaction product of ethylene glycol-di-glycidyl ether and (meth) acrylic acid, a reaction product of diethylene glycol-di-glycidyl ether and (meth)acrylic acid, bis (acryloxyethyl) hydroxyethyl isocyanurate, bis (methacryloxyethyl) hydroxyethyl isocyanurate, a reaction product of bisphenol A-di-glycidyl ether and (meth)acrylic acid, tetrahydrofurfuryl (meth)acrylate, caprolactone denaturation tetrahydrofurfuryl (meth)acrylate, 2-hydroxyethyl (meth)acrylate, 2-hydroxypropyl (meth)acrylate, polypropylene glycol (meth) acrylate, polyethylene glycol (meth)acrylate, phenoxy hydroxypropyl (meth)acrylate, acryloyl morpholine, methoxy polyethylene glycol (meth)acrylate, methoxy tetraethylene glycol (meth)acrylate, methoxy triethylene glycol (meth)acrylate, methoxy ethylene glycol (meth)acrylate, methoxy ethyl (meth)acrylate, glycidyl (meth)acrylate, glycerol (meth)acrylate, ethyl carbitol (meth)acrylate, 2-ethoxyethyl (meth)acrylate, N,N-dimethylaminoethyl (meth)acrylate, 2-cyanoethyl (meth)acrylate, a reaction product of butyl glycidyl ether and (meth)acrylic acid, butoxy triethylene glycol (meth)acrylate, and butanediol mono(meth)acrylate. These resins may be used alone or may be used as a mixture of some of the resins. These ultraviolet curable resins having no liquid crystallinity need to be added in such an amount that a composition containing the nematic liquid crystal monomer does not lose liquid crystallinity, and the amount added is preferably 0.1 to 20 parts by weight, more preferably 1.0 to 10 parts by weight based on 100 parts by weight of the nematic liquid crystal monomer containing a polymerizable group.

When the aforementioned nematic liquid crystal monomer having a polymerizable group and the polymerizable compound are ultraviolet curable, the composition containing them is curable by ultraviolet rays and thus, a photopolymerization initiator is added in order to cure the composition containing them by ultraviolet rays. Examples of the photopolymerization initiator include an acetophenone compound such as 2-methyl-1-[4-(methylthio)phenyl]-2-morpholinopropane-1 (Irgacure 907 manufactured by BASF Japan Ltd.), 1-hydroxy cyclohexyl phenyl ketone (Irgacure 184 manufactured by BASF Japan Ltd.), 4-(2-hydroxyethoxy)-phenyl(2-hydroxy-2-propyl) ketone (Irgacure 2959 manufactured by BASF Japan Ltd.), 1-(4-dodecylphenyl)-2-hydroxy-2-methylpropan-1-one (Darocure 953 manufactured by Merck KGaA), 1-(4-isopropylphenyl)-2-hydroxy-2-methylpropan-1-one (Darocure 1116 manufactured by Merck KGaA), 2-hydroxy-2-methyl-1-phenylpropan-1-one (Irgacure 1173 manufactured by BASF Japan Ltd.) and diethoxyacetophenone, benzoin compounds such as benzoin, benzoin methyl ether, benzoin ethyl ether, benzoin isopropyl ether, benzoin isobutyl ether, and 2,2-dimethoxy-2-phenylacetophenone (Irgacure 651 manufactured by BASF Japan Ltd.); benzophenone compounds such as benzoylbenzoic acid, methyl benzoylbenzoate, 4-phenylbenzophenone, hydroxybenzophenone, 4-benzoyl-4'-methyldiphenyl sulfide, and 3,3'-dimethyl-4-methoxybenzophenone (Kayacure MBP manufactured by Nippon Kayaku Co., Ltd.); and thioxanthone compounds such as thioxanthone, 2-chlorothioxanthone (Kayacure CTX manufactured by Nippon Kayaku Co., Ltd.), 2-methylthioxanthone, 2,4-dimethylthioxanthone (Kayacure RTX manufactured by Nippon Kayaku Co., Ltd.), isopropyl thioxanthone, 2,4-dichlorothioxanthone (Kayacure CTX manufactured by Nippon Kayaku Co., Ltd.), 2,4-diethylthioxanthone (Kayacure DETX manufactured by Nippon Kayaku Co., Ltd.), and 2,4-diisopropylthioxanthone (Kayacure DITX manufactured by Nippon Kayaku Co., Ltd.). The photopolymerization initiator is preferably, for example, Irgacure TPO, Irgacure TPO-L, Irgacure OXE01, Irgacure OXE02, Irgacure 1300, Irgacure 184, Irgacure 369, Irgacure 379, Irgacure 819, Irgacure 127, Irgacure 907, and Irgacure 1173 (all manufactured by BASF Japan Ltd.), more preferably, Irgacure TPO, Irgacure TPO-L, Irgacure OXE01, Irgacure OXE02, Irgacure 1300, and Irgacure 907. These photopolymerization initiators may be used alone or may be used as a mixture of multiple of the initiators at an optional ratio.

When a benzophenone compound or a thioxanthone compound is used as the photopolymerization initiator, an auxiliary agent may be additionally used to promote optical polymerization reaction. Examples of such an auxiliary agent include amine compounds such as triethanolamine, methyldiethanolamine, triisopropanolamine, n-butylamine, N-methyldiethanolamine, diethylaminoethyl methacrylate, Michler's ketone, 4,4'-diethylamino phenone, ethyl 4-dimethylaminobenzoate, (n-butoxy) ethyl 4-dimethylaminobenzoate, and isoamyl 4-dimethylaminobenzoate.

The amounts of the photopolymerization initiator and the auxiliary agent added can be in such a range that the liquid crystallinity of the composition containing the nematic liquid crystal monomer is not affected, and is preferably not less than 0.5 parts by weight and not more than 10 parts by weight, more preferably not less than 2 parts by weight and not more than 8 parts by weight approximately, based on 100 parts by weight of ultraviolet-curable compound in the composition. The amount of the auxiliary agent added to the composition is preferably 0.5 to 2 times larger than the mass of the photopolymerization initiator.

In addition, at least one kind of compound selected from the group consisting of compounds represented by the following formula (4), compounds represented by the following formula (5) and compounds represented by the following formula (6) (hereinafter simply referred to as "additive compound") is added together with a liquid crystal compound, whereby the heat resistance of the half-wave plate is improved and the variation of the phase difference value of the half-wave plate can be reduced even in a high temperature atmosphere.

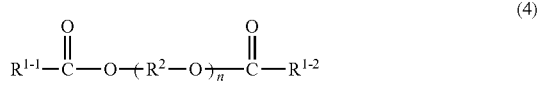

(4)

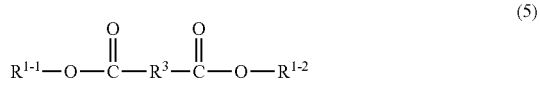

(5)

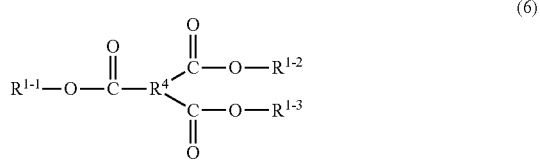

(6)

In formulas (4) to (6), each of $R^{1-1}$, $R^{1-2}$ and $R^{1-3}$ independently represents an alkyl group with a branched structure having a carbon number of 5 or more. When each of $R^{1-1}$, $R^{1-2}$ and $R^{1-3}$ is independently an alkyl group having a branched structure, the variation of the phase difference value of the half-wave plate under a high temperature atmosphere is particularly small. It is preferable that the carbon number is not less than 6 and not more than 18. It is more preferable that each of $R^{1-1}$, $R^{1-2}$ and $R^{1-3}$ is independently a $CH_3$—$(CH_2)_m$—CH(RX)-group. Here, RX represents an alkyl group having a carbon number of 1 to 5, and it is still more preferable that each of $R^{1-1}$, $R^{1-2}$ and $R^{1-3}$ is independently a $CH_3$—$(CH_2)_m$—$CH(C_2H_5)$— group, and it is particularly preferable that each of $R^{1-1}$, $R^{1-2}$ and $R^{1-3}$ is independently a 2-ethylhexyl group or 2-ethylbutyl group. Here, m represents an integer in the range of 1 to 6. In the formula (5), $R^3$ represents a -$(CH_2)_p$-group or a phenylene group, and p represents an integer of 4 to 8. When $R^3$ is a phenylene group, the phenylene group may have a substituent at any of o-position, m-position and p-position, but it is preferable to have a substituent at the o-position. In formula the (6), $R^4$ represents a substituted phenylene group, and the substituted phenylene group may have a substituent at any of o-position, m-position and p-position, but it is preferable to have substituents at the o-position and the p-position. In the formula (4), $R^2$ represents a —$CH_2$—$CH_2$-group, —$CH_2$—$CH(CH_3)$-group or —$CH_2$—$CH_2$—$CH_2$-group, and a —$CH_2$—$CH_2$-group is preferable.

Examples of the compounds represented by the formula (4) include triethylene glycol di-2-ethylhexanoate (3GO), tetraethylene glycol di-2-ethylhexanoate (4GO), triethyleneglycol-di-2-ethyl butyrate (3GH), tetraethyleneglycol-di-2-ethyl butyrate, pentaethyleneglycol-di-2-ethyl hexanoate, octaethyleneglycol-di-2-ethyl hexanoate, nonaethyleneglycol-di-2-ethylhexanoate, decaethyleneglycol-di-2-ethylhexanoate, etc.

Examples of the compounds represented by the formula (5) include bis(2-ethylhexyl) adipate, bis(2-ethylbutyl) adipate, bis(2-ethylhexyl) azelate, bis(2-ethyl butyl) azelate, sebacic acid-di-2-ethylhexyl, sebacic acid-di-2-ethylbutyl, phthalic acid-di-2-ethylhexyl, phthalic acid-di-2-ethylbutyl, etc.

Examples of the compounds represented by the formula (5) include trimellitic acid-tri-2-ethylhexyl, trimellitic acid-tri-2-ethylbutyl, etc.

The compounds represented by the formula (4), the compounds represented by the formula (5), and the compounds represented by the formula (6) may be used independently, or 2 or more kinds may be used in combination. Among these compounds, the compounds represented by the formula (4) are preferable because it is excellent in the compatibility with the liquid crystal compound described above, and a stable phase difference element can be obtained. Among the compounds represented by the formula (4), triethyleneglycol-di-2-ethylhexanoate (3GO), tetraethyleneglycol-di-2-ethylhexanoate (4GO) and triethyleneglycol-di-2-ethyl butyrate (3GH) are more preferable, and triethyleneglycol-di-ethylhexanoate (3GO) is further preferable because they are excellent in compatibility with the liquid crystal compound, and particularly excellent in the suppression effect of the variation in phase difference value of the half-wave plate under high temperature atmosphere.

The content of the at least one kind of additive compound selected from the group consisting of the compounds represented by the formula (4), the compounds represented by the formula (5) and the compounds represented by the formula (6) is not particularly limited, but with respect to 100 parts by weight of the liquid crystal compound, not less than 0.1 parts by weight and not more than 300 parts by weight are preferable, not less than 0.5 parts by weight and not more than 50 parts by weight are more preferable, not less than 0.8 parts by weight and not more than 30 parts by weight are still more preferable, and not less than 1 parts by weight and not more than 15 parts by weight are particularly preferable. When the content of the additive compound is less than 0.1 parts by weight, the effect of suppressing the variation of the phase difference value of the half-wave plate in a high temperature atmosphere may not be obtained. On the other hand, even when the content of the additive compound exceeds 300 parts by weight, the effect of suppressing the variation of the phase difference value of the half-wave plate in a high temperature atmosphere does not change, and thus it is preferable that the upper limit value of the content of the additive compound is not more than 300 parts by weight from the viewpoint of material cost.

(Support Substrate)

The half-wave plate may have a support substrate for supporting the phase difference layer. It is preferable that such a support substrate is transparent in a visible light region in order to maintain visibility of a display image, and specifically, it is good if transmittance of non-polarized light at a wavelength of 380 to 780 nm is 50% or more, it is preferable that the transmittance is 70% or more, and it is more preferable that the transmittance is 85% or more. Here, the transmittance of non-polarized light means the transmittance of light having no regularity in light vibration, that is, the transmittance of natural light. The support substrate may be colored, but it is preferable that the support substrate is not colored or less colored. Furthermore, it is preferable that the refractive index of the support substrate is 1.2 to 2.0, and it is more preferable that the refractive index of the support substrate is 1.4 to 1.8. The thickness of the support substrate may be appropriately selected according to an application, and it is preferably 5 µm to 1000 µm, more preferably 10 µm to 250 µm, and particularly preferably 15 µm to 150 µm.

The support substrate may be a single layer or a laminate of two or more layers. For example, triacetyl cellulose (TAC), acrylic, polycarbonate, polyvinyl chloride, polyolefin and polyethylene terephthalate (PET) are cited as the support substrate. Among these materials, triacetyl cellulose (TAC), polyolefin, acryl, etc. which have low birefringence are preferable because they do not change the polarization axis of incident P-polarized light or S-polarized light. Note that these support substrates can be used also as a block layer which will be described hereinafter.

(Block Layer)

Figure 7:
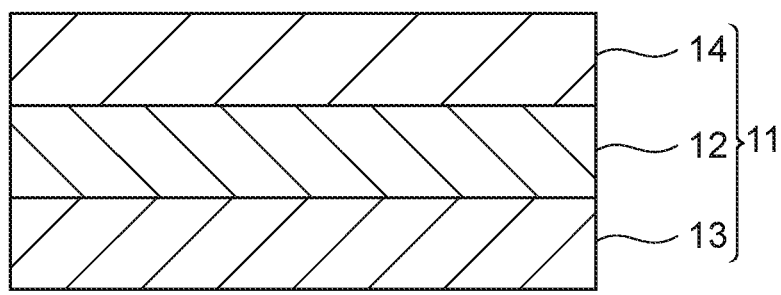
FIG. 7 is a side cross-sectional view showing an embodiment of a half-wave plate having a block layer.

It is preferable that the half-wave plate to be used in the present disclosure has a blocking layer on a side where the phase difference layer having the function of converting the polarization axis is present. FIG. 7 shows an embodiment of a half-wave plate having a block layer. The half-wave plate 11 shown in FIG. 7 includes a support substrate 13, a phase difference layer 12 formed on the support substrate 13, and a block layer 14 formed on the phase difference layer 12. In FIG. 7, the block layer 14 is formed on one side of the half-wave plate 11, but may be formed on both sides of the half-wave plate 11, that is, the support substrate 13 may be regarded as a block layer, and a block layer 14 may be further formed on the outside of the support substrate 13.

The block layer provided on one side or both sides of the half-wave plate is made of a polymer film or a cured film obtained by drying or curing a coating film formed from a resin composition. When the block layer is a polymer film, the block layer can also be used as the support substrate, and, for example, a triacetyl cellulose film (TAC), a cycloolefin polymer film (COP), a polyethylene terephthalate film (PET), an acrylic film, etc. are cited. Moreover, such a support substrate may be stretched as long as it can suppress reduction in phase difference value and can be used so as not to greatly impair the polarization axis conversion performance of the present disclosure. On the other hand, when the block layer is a cured film, specifically, a coating solution which is a resin composition for forming the block layer is coated onto to the surface of the half-wave plate, and the obtained coating film is dried or cured, thereby laminating the block layer on the half-wave plate.

When the half-wave plate is placed in contact with an in-vehicle intermediate film under a high temperature environment, for example, a use environment of a windshield of an automobile or the like, the phase difference value may be lowered. This is considered to be caused by erosion of the material itself of the in-vehicle intermediate film and an effect of a plasticizer or the like contained in the intermediate film. As described above, the half-wave plate has the block layer on the phase difference layer side, whereby the layer which may cause the variation of the phase difference value of the in-vehicle intermediate film or the like and the phase difference layer having the function of converting the polarization axis of the half-wave plate can be prevented from directly contacting each other. Thus, it is possible to suppress reduction of the phase difference value of the half-wave plate, and as a result, it is possible to provide a head-up display system which is excellent in heat resistance, has little variation in the phase difference value of the half-wave plate under high-temperature atmosphere, and can maintain stable optical performance.

The resin composition for forming the block layer includes, for example, one or more kinds of resin selected from the group consisting of polyvinyl alcohol resin, polyester resin, polyurethane resin, polyamide resin, polyimide resin and acrylic resin, and the block layer can be formed by coating and drying the above resin composition. Alternatively, the resin composition for forming a block is, for example, an ultraviolet curable resin composition, a thermosetting resin composition, and a mixture thereof, and the block layer can be obtained by coating and drying the curable resin composition and then curing the curable resin composition. It is preferable that such a curable resin composition is an ultraviolet curable resin composition from the viewpoint of transparency, coatability, production cost and the like.

The ultraviolet curable resin composition contains at least an ultraviolet curable resin and a photopolymerization initiator, and optionally further components. Polyfunctional (meth)acrylate having at least two or more (meth)acryloyl groups in the molecule is preferable as the ultraviolet curable resin, and, for example, di(meth)acrylate, polyfunctional polyester acrylates, polyfunctional urethane (meth) acrylates, polyfunctional epoxy (meth)acrylates, etc. are cited. These materials may be used alone or in mixture of two or more materials thereof. By using these ultraviolet curable resins, it is possible to more effectively prevent the reduction of the phase difference value of the half-wave plate.

Examples of di(meth)acrylates include 1,4-butanediol di(meth)acrylate, 1,6-hexanediol di(meth)acrylate, 1,9-nonanediol di(meth)acrylate, trimethylolpropane di(meth)acrylate, dipentaerythritol di(meth)acrylate, polyethylene glycol di(meth)acrylate, tripropylene glycol di(meth)acrylate, di(meth)acrylate of ε-caprolactone adduct of neopentyl glycol hydroxypivalate (for example, KAYARADHX-220, HX-620, etc., manufactured by Nippon Kayaku Co., Ltd.), and di(meth)acrylate of EO adduct of bisphenol A, etc.

Examples of polyfunctional polyester (meth) acrylates include trimethylolpropane tri(meth)acrylate, trimethylolpropane polyethoxy tri(meth)acrylate, pentaerythritol tetra (meth)acrylate, pentaerythritol tri(meth)acrylate, ditrimethylolpropane tetra(meth)acrylate, ditrimethylolpropane tri (meth)acrylate, dipentaerythritol tri(meth)acrylate, dipentaerythritol tetra(meth) acrylate, dipentaerythritol penta(meth)acrylate, dipentaerythritol hexa(meth)acrylate, and tripentaerythritol octa (meth)acrylates, etc.

Examples of polyfunctional urethane (meth)acrylates include polyols such as ethylene glycol, 1,4-butanediol, polytetramethylene glycol, neopentyl glycol, polycaprolactone polyol, polyester polyol, polycarbonate diol or polytetramethylene glycol, organic polyisocyanates such as hexamethylene diisocyanate, alicyclic polyisocyanate, tolylene diisocyanate, xylylene diisocyanate or 4,4'-diphenylmethane diisocyanate, 2-hydroxyethyl (meth)acrylate, 2-hydroxypropyl (meth)acrylate, 1,4-butanediol mono(meth)acrylate, urethane (meth)acrylates which are reaction products with adducts of ε-caprolactone of 2-hydroxyethyl (meth)acrylate or hydroxyl group-containing ethylenically unsaturated compounds such as pentaerythritol tri (meth)acrylate, etc.

Examples of polyfunctional epoxy (meth)acrylates include bisphenol A type epoxy resin, bisphenol F type epoxy resin, phenol novolac type epoxy resin, trisphenol methane type epoxy resin, polyethylene glycol diglycidyl ether, epoxy (meta)acrylates which are reaction products of polyglycidyl compounds such as glycerin polyglycidyl ether or trimethylolpropane polyglycidyl ether with (meth) acrylic acid, etc.

Examples of polyfunctional (meth)acrylates having three or more (meth)acryloyl groups include pentaerythritolssuch as pentaerythritol tetra(meth)acrylate, pentaerythritol tri (meth)acrylate, dipentaerythritol hexa(meth)acrylate, dipentaerythritol penta(meta)acrylate, dipentaerythritol tetra (meth)acrylate and dipentaerythritol tri(meth) acrylate; methylols such as trimethylolpropane tri(meth)acrylate, ditrimethylolpropane tetra(meth)acrylate, and ditrimethylolpropane tri(meth)acrylate; and isocyanurates such as trisacryloxyethyl isocyanurate and trisallyl isocyanurate.

A block layer formed of a resin composition containing, as the above-mentioned ultraviolet curable resin, not less than 5 wt % and not more than 60 wt %, preferably not less than 20 wt % and not more than 50 wt % of epoxy acrylates having two acryloyl groups in the molecule or urethane acrylates having three or more acryloyl groups in the molecule is preferable from the viewpoint of adhesiveness to the half-wave plate and processability because of little curing shrinkage when ultraviolet curing is performed. Furthermore, the block layer formed from such a resin composition is preferable because chips are hardly generated when the optical laminate according to the present disclosure is subjected to cutting processing. Furthermore, a block layer formed of a resin composition containing, as an ultraviolet curable resin, not less than 5 wt % and not more than 80 wt %, preferably not less than 15 wt % and not more than 70 wt % of a compound having at least 3 or more (meth) acryloyl groups in the molecule is preferable because it has a higher effect of preventing reduction of the phase difference value of the half-wave plate due to erosion of a plasticizer or the like. When the upper limit value of the content of the compound having at least three or more (meth)acryloyl groups in the molecule is larger than 80 wt %, the curing shrinkage is large, so that the processability and the adhesiveness to the half-wave plate tend to deteriorate, and furthermore, chips are easily generated when the optical laminate is subjected to cutting processing. On the other hand, when the lower limit value of the content of the compound is less than 5 wt %, the above performance of the block layer tends to deteriorate.

Furthermore, it is preferable to use, as a material for forming the block layer, a resin having a relatively high glass transition temperature (Tg), a water-soluble resin, and acrylates having three or more acryloyl groups in the molecule. Thereby, the effect of improving the durability of the block layer can be enhanced. It is preferable that the glass transition temperature (Tg) is not less than 80° C. and not more than 300° C., and it is more preferable that the glass transition temperature (Tg) is not less than 150° C. and not more than 250° C. In particular, the water-soluble resin, the resin having the glass transition temperature of not less than 150° C., and the acrylates having three or more acryloyl groups in the molecule have a more remarkable effect of preventing reduction of the phase difference value of the half-wave plate.

Examples of the photopolymerization initiator include benzoins such as benzoin, benzoin methyl ether, benzoin ethyl ether, benzoin isopropyl ether, and benzoin isobutyl ether; acetophenones such as acetophenone, 2,2-diethoxy-2-phenylacetophenone, 1,1-dichloroacetophenone, 2-hydroxy-2-methyl-phenylpropane-1-one, diethoxyacetophenone, 1-hydroxycyclohexylphenylketone, and 2-methyl-1-[4-(methylthio)phenyl]-2-morpholinopropane-1-one; anthraquinones such as 2-ethylanthraquinone, 2-t-butylanthraquinone, 2-chloroanthraquinone, and 2-amylanthraquinone; thioxanthones such as 2,4-diethylthioxanthone, 2-isopropylthioxanthone, and 2-chlorlthioxanthone; ketals such as acetophenone dimethyl ketal, and benzyl dimethyl ketal; benzophenones such as benzophenone, 4-benzoyl-4'-methyldiphenylsulfide, and 4,4'-bismethylaminobenzophenone; and phosphine oxides such as 2,4,6-trimethylbenzoyl diphenylphosphine oxide, and bis(2,4,6-trimethylbenzoyl)-phenylphosphine oxide.

Specific examples of the photopolymerization initiator include commercial products such as Irgacure 184 (1-hydroxy cyclohexyl phenyl ketone) and Irgacure 907 (2-methyl-1-(4-(methylthio)phenyl)-2-morpholinopropane-1-one) manufactured by Ciba Specialty Chemicals Ltd., and Lucirin TPO (2,4,6-trimethylbenzoyl diphenylphosphine oxide) manufactured by BASF Ltd. These materials may be used alone or may be used in mixture of two or more materials.

It is preferable that the photopolymerization initiator is contained in a solid portion of the resin composition for forming the block layer by not less than 0.01 wt % and not more than 10 wt %, and it is more preferable that the photopolymerization initiator is contained by not less than 1 wt % and not more than 7 wt %.

Solvent is further contained in the resin composition for forming the block layer. Such solvent is not particularly limited as long as it can dissolve the resin, the photopolymerization activator and the like to be used, and for example, methyl ethyl ketone, methyl isobutyl ketone, isopropanol, cyclopentanone, and the like are cited, and methyl ethyl ketone is preferable. Moreover, these solvents can be added at arbitrary ratio, and only one kind may be added or plural kinds of solvents can be used in combination. These solvents are dried and removed in a drying step.

The resin composition for forming the block layer can further contain a curing accelerator. Examples of the curing accelerator include amines such as triethanol amine, diethanol amine, N-methyldiethanol amine, 2-methylaminoethyl benzoate, dimethylamino acetophenone, p-dimethylamino benzoate isoamino ester, and EPA, and hydrogen donors such as 2-mercaptobenzothiazole. It is preferable that the contents of these curing accelerators are not less than 0 wt % and not more than 5 wt % in the solid portion of the resin composition for forming the block layer.

Moreover, the resin composition for forming the block layer may contain one or more additives such as a leveling agent, a defoaming agent, an ultraviolet absorbing agent, a photostabilizing agent, an oxidation inhibitor, a polymerization inhibitor, and a crosslinking agent as necessary so as to impart intended functions, respectively. Examples of the leveling agent include fluorine-based compounds, silicone-based compounds, acryl-based compounds, etc. Examples of the ultraviolet absorbing agent include benzotriazole-based compounds, benzophenone-based compounds, and triazine-based compounds, etc. Examples of the photostabilizing agent include hindered amine-based compounds, and benzoate-based compounds, etc. For example, phenol-based compounds, etc. are cited as the oxidation inhibitor. For example, methoquinone, methyl hydroquinone, hydroquinone, etc. are cited as the polymerization inhibitor. Examples of the crosslinking agent include polyisocyanates such as alicyclic polyisocyanate, tolylene diisocyanate, xylylene diisocyanate, and 4,4'-diphenylmethane diisocyanate, and melamine compounds. The addition amounts of these additives are appropriately designed in accordance with the functions to be imparted.

The thickness of the block layer is not particularly limited, but with respect to the upper limit value of the thickness of the block layer configured by the ultraviolet curable resin, 50 μm is preferable, and 20 μm is more preferable from the viewpoint of curing shrinkage. On the other hand, with respect to the lower limit value of the thickness of the block layer configured by the ultraviolet curable resin, 0.1 μm is preferable, and 1 µm is more preferable from the viewpoint of curing performance. When the thickness of the block layer is within a range from not less than 0.1 µm to not more than 50 µm, reduction of the phase difference value of the half-wave plate can be prevented more effectively. The block layer can be obtained by coating the resin composition for forming the block layer so that the film thickness after drying is within a range from not less than 0.1 µm to not more than 50 µm and then performing ultraviolet radiation or heating after the coating film is dried, thereby forming a cured film.

The coating method of the resin composition for forming the block layer is not particularly limited, and for example, bar coater coating, wire bar coating, air knife coating, gravure coating, reverse gravure coating, micro gravure coating, micro reverse gravure coater coating, die coater coating, dip coating, spin coat coating, spray coating, etc. are cited.

When the resin contained in the resin composition for forming the block layer is an ultraviolet curable resin, ultraviolet rays are irradiated to cure the resin, but electron beams or the like can be also used. When the resin is cured by the ultraviolet rays, an ultraviolet irradiating device having a xenon lamp, a high-pressure mercury-vapor lamp, a metal halide lamp, an LED or the like as a light source can be used, and a light amount, arrangement of the light source and the like are adjusted as necessary. When the high-pressure mercury-vapor lamp is used, it is preferable that the resin is cured at a conveyance speed of 5 to 60 m/minute with respect to a single lamp having energy of 80 to 120 W/cm$^2$. On the other hand, when the resin is to be cured by electron beams, it is preferable that an electron beam accelerating device having energy of 100 to 500 eV is used, and at that time, the photopolymerization initiator does not have to be used.

Next, a method of producing the half-wave plate to be used in the present disclosure will be described by using nematic liquid crystal monomers having the above-mentioned polymerizable groups. In such a method, for example, nematic liquid crystal monomers having the polymerizable groups are dissolved in solvent, and then a photopolymerization initiator is added to the solution. Such solvent is not particularly limited as long as it can dissolve the liquid crystal monomers to be used, and for example, cyclopentanone, toluene, methyl ethyl ketone, methyl isobutyl ketone, etc. are cited, and cyclopentanone, toluene, etc. are preferable. Thereafter, the solution is coated onto a plastic film such as a PET film or a TAC film to be used as a support substrate so that the thickness is as uniform as possible, and the solution is left for a certain time while the solvent is removed by heating under such a temperature condition that the solution becomes liquid crystal and orientates on the coated film. At this time, the orientation of the liquid crystal can be made more uniform by executing rubbing processing in a desired orientation direction before the coating or orientation processing such that a photo-alignment material which exerts photo-alignment characteristics by polarized radiation is made into a film on the support substrate surface and is subjected to polarized radiation or the like. As a result, the slow axis of the half-wave plate can be controlled to a desired angle, and a haze value of the half-wave plate can be reduced. Then, while this oriented state is maintained, the nematic liquid crystal monomers are irradiated with ultraviolet rays by a high-pressure mercury-vapor lamp or the like so as to fix the orientation of the liquid crystal, whereby the half-wave plate having a desired slow axis can be obtained.

When the polymerizable liquid crystal monomers are directly coated on the support substrate which has been subjected to the orientation processing as described above, that is, when the half-wave plate has a polymerizable liquid crystal layer provided on the support substrate which has been subjected to the orientation processing, the half-wave plate is easy to handle because it has a coated film. In addition, such a configuration has less manufacturing steps as compared with a configuration in which the polymerizable liquid crystal layer is bonded to another substrate by using an adhesive bond, a pressure-sensitive adhesive or the like, so that the optical laminate to be used in the present disclosure can be manufactured at lower cost. Note that when the above-described orientation processing is performed on the support substrate and the polymerizable liquid crystal monomers are directly coated on the support substrate which has been subjected to the orientation processing, triacetyl cellulose (TAC), polyolefin (COP), acryl, nylon, polyester (PE), polycarbonate (PC), polyvinyl alcohol resin (PVA), polyvinyl butyral resin (PVB), polyurethane, ethylene-vinyl acetate copolymer resin (EVA) or the like which is adjusted to have small birefringence can be used as the support substrate because the polarization axis of the half-wave plate is not changed. Furthermore, even when the support substrate is a plastic film having high birefringence due to stretching or the like, the plastic film having high birefringence can be used by arranging the slow axis in parallel to or orthogonally to the polarization axis of P-polarized light.

In the case of the half-wave plate having the block layer, when the polymerizable liquid crystal monomers are directly coated on the above-described supporting substrate which has been subjected to the orientation processing as described above, that is, the half-wave plate has the polymerizable liquid crystal layer provided on the support substrate which has been subjected to the orientation processing, the support substrate has a function of preventing reduction of the phase difference value of the half-wave plate as in the case of the block layer. When the half-wave plate has such a configuration, a layer that may cause variation of the difference phase value of the in-vehicle intermediate film also does not directly contact the polymerizable liquid crystal layer of the half-wave plate from the support substrate side, so that it is possible to suppress reduction of the phase difference value of the half-wave plate. In addition, such a configuration can reduce the number of manufacturing steps for forming one layer of the block layer as compared with the configuration in which the block layer is provided on both sides of the half-wave plate, so that the optical laminate to be used in the present disclosure can be made at lower cost.

Figure 8:
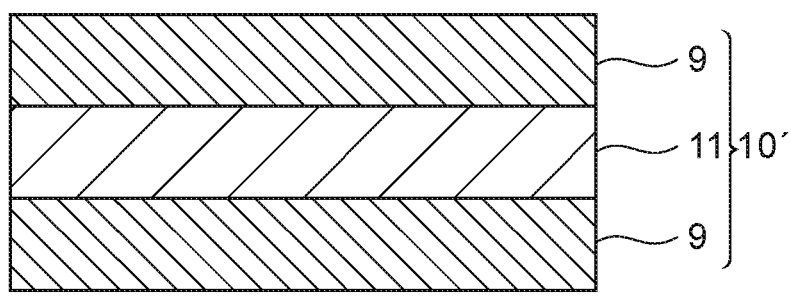
FIG. 8 is a side cross-sectional view showing an embodiment of an intermediate laminate including the half-wavelength plate having the block layer.
Figure 9:
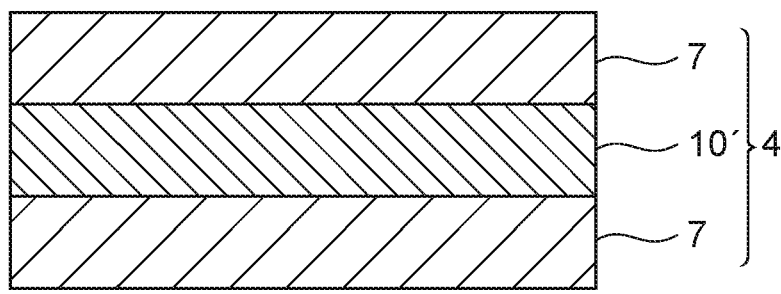
FIG. 9 is a side cross-sectional view showing an embodiment of an optical laminate including the intermediate laminate shown in FIG. 8.

The optical laminate to be used in the present disclosure may include an intermediate laminate in which an intermediate film is formed on a half-wave plate having a block layer. FIG. 8 shows one embodiment of such an intermediate laminate. An intermediate laminate 10' shown in FIG. 8 includes a half-wave plate 11 having a block layer and two intermediate films 9 on one side, and has a configuration in which the half-wave plate 11 is sandwiched between the two intermediate films 9. FIG. 9 shows one embodiment of the optical laminate having such an intermediate laminate, and the optical laminate 4 shown by FIG. 9 has a configuration in which the intermediate laminate 10' having the block layer is sandwiched by two substrate materials 7. In the intermediate laminate 10', the intermediate film 9 may be formed on the block layer 14 side, and may also be formed on the support substrate 13 side of the half-wave plate 11. When the optical laminate 4 includes the intermediate laminate 10', the intermediate film 9 also has a function as a pressure-sensitive adhesive or an adhesive bond to maintain the adhesiveness between the substrate material 7 and the half-wave plate 11 as in the case of the optical laminate 4 shown in FIG. 5.

(Intermediate Film)

When an intermediate film is further laminated on the optical laminate, a thermoplastic resin can be used as the intermediate film, and it is preferable to use an in-vehicle intermediate film which has been generally used. Such an in-vehicle intermediate film is, for example, a polyvinyl butyral based resin (PVB), a polyvinyl alcohol-based resin (PVA) or an ethylene-vinyl acetate copolymer-based resin (EVA). These resins are preferable because they are versatile as intermediate films for laminated glass. The thickness of the intermediate film is not particularly limited as long as it does not affect the reflection of display light, and can be appropriately designed according to an application.

It is preferable that a plasticizer is added to the intermediate film from the viewpoint of processability. Examples of such plasticizers include organic acid ester plasticizers such as monobasic organic acid esters and polybasic organic acid esters, and phosphoric acid plasticizers such as organic phosphoric acid plasticizers and organic phosphorous acid plasticizers. Examples of the monobasic organic acid esters include glycol esters obtained by the reaction between glycol such as triethylene glycol, tetraethylene glycol or tripropylene glycol, and monobasic organic acid such as butyric acid, isobutyric acid, caproic acid, 2-ethylbutyric acid, heptylic acid, n-octylic acid, 2-ethylhexyl acid, pelargonic acid (n-nonyl acid) or decyl acid.

Examples of the polybasic organic acid esters include ester compounds of polybasic organic acid such as adipic acid, sebacic acid, or azelaic acid, and alcohol having a straight chain or a branch structure with the carbon number of 4 to 8. Examples of such organic ester plasticizers include triethylene glycol-di-2-ethyl butyrate, triethylene glycol-di-2-ethylhexanoate, triethylene glycol dicaprylate, triethylene glycol-di-n-octanoate, triethylene glycol-di-n-heptanoate, tetraethylene glycol-di-2-ethylhexanoate, tetraethylene glycol-di-n-heptanoate, dibutyl sebacate, dioctyl azelate, dibutyl carbitol adipate, ethyleneglycol-di-2-ethyl butyrate, 1,3-propylene glycol-di-2-ethyl butyrate, 1/2-butylenegly-col-di-2-ethyl butyrate, diethylene glycol-di-2-ethyl butyrate, diethylene glycol-di-2-ethyl hexanoate, dipropylene glycol-di-2-ethyl butyrate, triethylene glycol-di-2-ethyl pentanoate, tetraethylene glycol-di-2-ethyl butyrate, diethylene glycol dicapryate, triethylene glycol-di-n-heptanoate, tetraethylene glycol-di-n-heptanoate, triethylene glycol diheptanoate, tetraethylene glycol diheptanoate, dihexyl adipate, dioctyl adipate, hexylcyclohexyl adipate, a mixture of heptyl adipate and nonyl adipate, diisononyl adipate, heptylnonyl adipate, dibutyl sebacate, oil-modified alkyd sebacate, and a mixture of phosphate ester and adipate ester.

Examples of the organic phosphoric plasticizers include tributoxyethylphosphate, isodecylphenylphosphate, and triisopropylphosphate.

The intermediate film may be appropriately added and blended with an ultraviolet absorbing agent, an anti-oxidizing agent, an antistatic agent, a thermal stabilizer, a coloring agent, an adhesion adjusting modifier or the like, and particularly, an intermediate film in which fine particles absorbing infrared rays are dispersed is important to manufacture a high-performance thermal insulating laminated glass. As the fine particles absorbing infrared rays may be used metal selected from the group consisting of Sn, Ti, Zn, Fe, Al, Co, Ce, Cs, In, Ni, Ag, Cu, Pt, Mn, Ta, W, V, and Mo, metal oxides thereof, metal nitrides thereof, the aforementioned metal, metal oxides or metal nitrides doped with Sb or F, or ultrafine particles of materials having conductivity such as a composite containing at least two or more kinds of the above materials. Particularly, when the thermal insulating laminated glass is to be used as a window for a construction or an automobile requiring transparency, tin-doped indium oxide (ITO), antimony-doped tin oxide (ATO), and fluorine-doped tin oxide which are transparent in a visible light region are particularly preferable. It is preferable that a particle diameter of the fine particles absorbing infrared rays is 0.2 μm or less. If the particle diameter of the fine particles is 0.2 μm or less, the fine particles can absorb infrared rays while suppressing scattering of light in the visible light region, characteristics such as adhesion, transparency, durability and the like can be maintained as the same level as a non-added intermediate film while electric-wave transmittance and transparency are ensured without causing occurrence of a haze, and moreover, laminated glass laminating processing can be executed in a work on an ordinary laminated glass manufacturing line. Note that when PVB is to be used in the intermediate film, in order to keep a water content in the intermediate film optimally, laminating processing is executed in a chamber of constant temperature and constant humidity. Moreover, with respect to the intermediate film, a part thereof may be colored, a layer having a sound insulating function may be sandwiched, or in order to reduce occurrence of a double image in the HUD system, an object with inclination in the thickness (wedge shape) or the like may be used.

In particular, when the intermediate film is made of PVB resin, there is a risk that the half-wave plate having the polymerizable liquid crystal layer as the phase difference layer may be deteriorated under high temperature conditions due to the contact between the intermediate film and the polymerizable liquid crystal layer, and thus the retardation value may be reduced. This is considered to be caused by erosion of the PVB resin itself adjacent to the half-wave plate and the effect of the above-mentioned plasticizer contained in the PVB resin or the like. The optical laminate used in the present disclosure includes the half-wave plate having the block layer, so that even when the intermediate film made of the PVB resin or the intermediate film made of the PVB resin containing the plasticizer as described above is laminated so as to directly contact the phase difference layer of the half-wave plate, deterioration of the half-wave plate can be suppressed, and also variation of the phase difference value can be suppressed.

When the optical laminate has the intermediate laminate in which the half-wave plate is sandwiched between the two intermediate films, it is preferable that the two intermediate films are films formed by lamination. A method of laminating the intermediate film is not particularly limited, but for example, a method of simultaneously press-fitting the intermediate film, the half-wave plate and the intermediate film by using a nip roll to perform lamination may be cited. When the nip roll can be heated under lamination, it is also possible to perform press-fitting while heating. When the adhesion between the intermediate film and the half-wave plate is poor, lamination may be performed after the intermediate film has been subjected to a surface treatment in advance by a corona treatment or a plasma treatment.

The intermediate film may be directly laminated on one side or both sides of the half-wave plate in a state where it is dissolved in solvent. When a polyvinyl butyral based resin (PVB) is used as the intermediate film, it is preferable that the lower limit value of the butyralization degree is 40 mol %, it is more preferable that the lower limit value is 55 mol %, and it is particularly preferable that the lower limit value is 60 mol %. On the other hand, it is preferable that the upper limit value of the butyralization degree is 85 mol %, it is more preferable that the upper limit value is 80 mol %, and it is particularly preferable that the upper limit value is 75 mol %. Note that the butyralization degree can be measured by an infrared absorption spectrum (IR) method, and can be measured, for example, by using FT-IR.

It is preferable that the lower limit value of the amount of hydroxyl groups of the polyvinyl butyral based resin is 15 mol %, and it is preferable that the upper limit value is 35 mol %. When the amount of hydroxyl groups is less than 15 mol %, in the case of use of glass as the substrate material, the adhesiveness between the intermediate film for laminated glass and glass may deteriorate, and penetration resistance of laminated glass may deteriorate. On the other hand, when the amount of hydroxyl groups exceeds 35 mol %, the intermediate film may become hard.

The polyvinyl butyral based resin can be prepared by acetalizing polyvinyl alcohol with aldehyde. Polyvinyl alcohol is usually obtained by saponifying polyvinyl acetate, and polyvinyl alcohol having a degree of saponification of 80 to 99.8 mol % is generally used. It is preferable that the upper limit value of the degree of polymerization of polyvinyl alcohol is 4,000, it is more preferable that the upper limit value is 3,000, and it is particularly preferable that the upper limit value is 2,500. When the degree of polymerization exceeds 4,000, formation of the intermediate film may be difficult.

<Reflection Mirror>

The HUD system of the present disclosure may include a reflection mirror. The reflection mirror is not particularly limited as long as it can reflect display light from the display unit toward the optical laminate, and is configured by, for example, a plane mirror, a concave mirror or the like. When the concave mirror is used as the reflection mirror, the concave mirror can also magnify the display light from the display unit at a predetermined magnification.

<Method of Manufacturing Optical Laminate>

Next, an example of a method of producing the optical laminate by using glass as the substrate material will be specifically described. First, two glass plates are prepared. When a glass plate is used as laminated glass for a windshield of an automobile, it is preferable to use soda-lime glass made by a float method. The glass may be transparent or colored green, and is not particularly limited. Although glass plates having a thickness of about 2 mmt are usually used, but glass plates having a thickness slightly smaller than the above thickness can also be used according to a recent demand for weight reduction of glass. The glass plates are cut into a predetermined shape, and the glass edges thereof are chamfered and cleaned. When a black frame-like or dot-like print is required, the print is applied onto the glass plates. When a curved surface is required like a windshield, the glass plates are heated to 650° C. or more, then the two sheets are shaped to have the same surface shape by pressing with a mold or bending with their own weight, and then the glass is cooled. At this time, when the cooling rate is made too fast, a stress distribution occurs in the glass plates and becomes hardened glass, thus the glass is gradually cooled. One of the thus-prepared glass plates is placed horizontally, a half-wave plate is laminated the glass plate, and the other glass plate is further placed. Alternatively, a method of sequentially stacking an intermediate film, a half-wave plate, and an intermediate film, or sequentially stacking an intermediate film and a half-wave plate or sequentially stacking a half-wave plate and an intermediate film on the glass plate, and finally placing the other glass plate may be adopted. Next, the half-wave plate and the intermediate films protruding from the edges of the glasses are cut and removed with a cutter. Thereafter, they are heated to a temperature of 80° C. to 100° C. while air existing among the sandwich-laminated glasses, the intermediate film, and the half-wave plate is degassed to perform pre-adhesion. With respect to a method of degassing air, there are two types of methods of a bag method for degassing air while a preliminary laminate of glass/(intermediate film)/half-wave plate/(intermediate film)/glass is wrapped in a rubber bag made of a heat resistant rubber or the like, and a ring method of covering and sealing only the edges of the glasses of the preliminary laminate, and either method may be used. After the pre-adhesion is completed, the preliminary laminate of glass/(intermediate film)/half-wave plate/(intermediate film)/glass pre-laminate removed from the rubber bag or the preliminary laminate from which the rubber ring is removed is placed in an autoclave, heated to 120° C. to 150° C. under high pressure of 10 kg/cm² to 15 kg/cm², and subjected to a heating and pressurizing treatment for 20 minutes to 40 minutes under the above condition. After the heating and pressuring treatment, the preliminary laminate is cooled to 50° C. or less and further depressurized, and the optical laminate formed of glass/(intermediate film)/half-wave plate/(intermediate film)/glass is removed from the autoclave.

The thus-obtained optical laminate can be used as a windshield, side glass, rear glass, roof glass of a large special automobile, a small special automobile, etc. as well as an ordinary car, a compact car, a mini car and the like. Furthermore, it can be used as a window of a railway vehicle, a ship, or an aircraft, and also as a window material for building materials and industrial use. Furthermore, the optical laminate can also be used by laminating or bonding together with a member having a UV cut function or a light control function.

Figure 10:
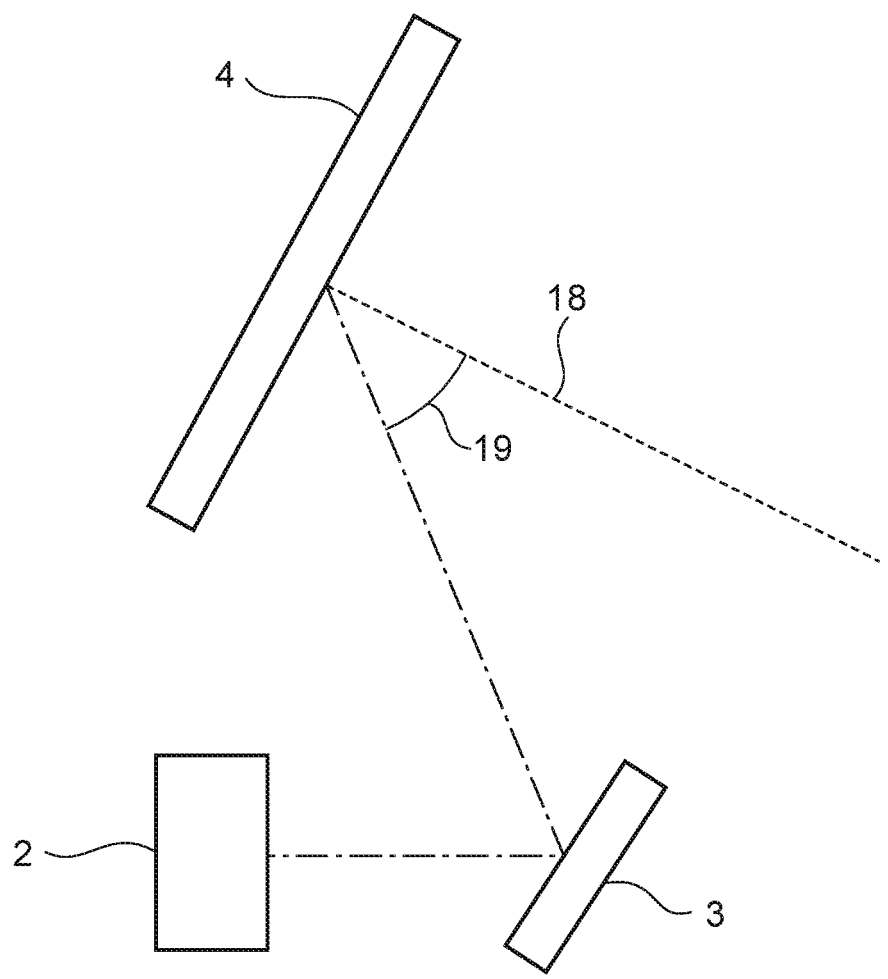
FIG. 10 is a schematic diagram showing an outline of incidence of P-polarized light in the vicinity of a Brewster's angle to the optical laminate.

In the HUD system of the present disclosure, as shown in FIG. 10, when the display light emitted from the display unit 2 is P-polarized light, and the Brewster's angle of P-polarized light with respect to the optical laminate 4 is α, it is preferable that the incident angle of the P-polarized light to be incident to the optical laminate 4 is in a range from not less than α−10° to not more than α+10°. That is, by causing the P-polarized light from the display unit 2 to be incident to the optical laminate 4 at an incident angle 19 in the vicinity of the Brewster's angle with respect to an axis 18 perpendicular to the surface of the optical laminate, the reflection of the P-polarized light at the surface of the optical laminate is greatly reduced. The P-polarized light transmitted through the optical laminate is converted into S-polarized light by the half-wave plate constituting the optical laminate, and the converted S-polarized light is reflected at the other interface of the optical laminate 4. The reflected S-polarized light is converted again into P-polarized light by the half-wave plate, and this P-polarized light reaches an observer. As a result, a display image can be visually recognized by the observer as a virtual image. On the other hand, when the incident angle of P-polarized light is less than α−10° or larger than α+10°, the incident angle of the P-polarized light deviates from the vicinity of the Brewster's angle, so that the reflectance of P-polarized light increases, and thus a double image may occur. By adjusting the incident angle of P-polarized light to the vicinity of the Brewster's angle as described above, it is possible to greatly reduce occurrence of double images. Furthermore, since reflected light from a road surface is generally S-polarized light, polarization sunglasses are designed to be capable of absorbing S-polarized light. Therefore, in the conventional HUD system using S-polarized light, the visibility of display images of HUD through the polarization sunglasses is extremely reduced. On the other hand, in the case of a HUD system utilizing P-polarized light in which P-polarized light reaches an observer, occurrence of double images can be suppressed and visibility of display images can be enhanced even when polarization sunglasses are worn.

In the above embodiment, the intermediate film is arranged as one independent film so as to be laminated between the substrate material and the half-wave plate. However, in place of this arrangement, the intermediate film may be arranged while directly laminated on the substrate material in advance. Specifically, at least one intermediate film of the two interlayer films may be a film which has been directly laminated on the substrate material in advance. By using such an intermediate film, the step of arranging the intermediate film between the half-wave plate and the substrate material can be omitted, so that the manufacturing cost can be reduced.

EXAMPLES

The present disclosure will be illustrated in detail by the following examples. In the examples, "parts" means parts by weight.

Example 1

<Preparation of Coating Liquid (Liquid Crystal Composition)

Coating liquid A having a composition shown in Table 1 was prepared.

TABLE 1

| COMPOSITION TABLE OF COATING LIQUID A | | |
|---|---|---|
| MATERIAL (KIND) | MATERIAL NAME (MANUFACTURER) | AMOUNT ADDED (PARTS) |
| POLYMERIZABLE LIQUID CRYSTAL | LC242 (BASF LTD.) | 25 |
| PHOTOPOLYMER- IZATION INITIATOR | Irgacure 907 (BASF LTD.) | 1 |
| SOLVENT | Toluene | 74 |

<Production of Half-Wave Plate>

The prepared coating liquid A was used, and a half-wave plate was produced by the following procedure. A TAC film (80 μm in thickness) which had been subjected to a rubbing treatment by a method described in an example 1 of Japanese Patent Laid-open No. 2002-90743 was used as a support substrate.

(1) The coating liquid A was coated on a rubbing-processed surface of the TAC film at room temperature by using a wire bar so that the thickness of the half-wave plate obtained after drying was equal to 2 μm.

(2) The obtained coating film was heated at 50° C. for 2 minutes to remove the solvent and form a liquid crystal phase. Next, the liquid crystal phase was subjected to UV irradiation with a high pressure mercury lamp (Harrison Toshiba Lighting Co., Ltd.) at an output of 120 W for 5 to 10 seconds to fix the liquid crystal phase, thereby producing a half-wave plate in which a polymerizable liquid crystal layer was laminated on the TAC film.

<Production of Intermediate Laminate>

Two transparent polyvinyl butyral intermediate films having a thickness of 0.38 mm and containing triethylene glycol di-2-ethylhexanoate as a plasticizer were used, and the produced half-wave plate was arranged between the two polyvinyl butyral intermediate films, and then subjected to pressurization and press-fitting by a laminator, thereby producing an intermediate laminate.

<Production of Optical Laminate>

The produced intermediate laminate was arranged between two transparent glass plates each having a thickness of 2 mm, and then subjected to pressurization and heating according to the following method, thereby producing an optical laminate.

First, the produced intermediate laminate and one of the glass plates were laminated on the other glass plate in order. Next, an extra part of the intermediate laminate which protruded from the edge portions of the laminated glass plates was cut and removed. The resultant was wrapped with a rubber bag, and degassed for ten minutes in an autoclave heated to 90° C. to perform preliminary adhesion. The intermediate laminate which had been subjected to preliminary adhesion was cooled to room temperature, then removed from the rubber bag, and again heated and pressurized in an autoclave at 135° C. under a high pressure of 12 kg/cm$^2$ for 30 minutes. Thus, an optical laminate having a good appearance to be used in the present disclosure was produced. The phase difference value of the obtained optical laminate was measured with an automatic birefringence meter ("KOBRA-21ADH" manufactured by Oji Scientific Co., Ltd.), and a measurement result indicated that the phase difference value at 546 nm was 252 nm.

<Measurement of Polarization Axis Conversion Performance of Half-Wave Plate>

Figure 11:
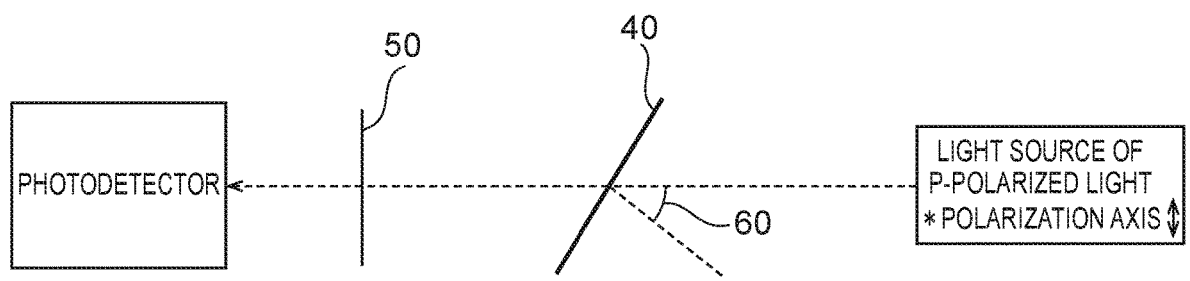
FIG. 11 is a schematic diagram showing a method of measuring polarization axis conversion performance of the half-wave plate.

The polarization axis conversion performance of the half-wave plate was measured according to a measurement method shown in FIG. 11 by using a spectrophotometer MPC-3100 manufactured by Shimadzu Corporation. In FIG. 11, P-polarized light is incident at an incident angle 60 from the light source to a measurement sample 40, and a polarization plate 50 for absorbing S-polarized light is installed between a light receiver side and the measurement sample 40. Note that in this measurement method, P-polarized light is used as a light source and the polarization plate for absorbing S-polarized light is installed on the light receiver side. Therefore, light (average light transmittance) detected by a photodetector is lower as the measurement sample has higher polarization axis conversion performance. By using this measurement method, the optical laminate manufactured in the example 1 was set as the measurement sample 40 so that the angle θ formed by the slow axis of the half-wave plate and the polarization axis of P-polarized light incident to the optical laminate was equal to 50°, 45°, 40°, 35°, and 30°, and the average transmittance of the optical laminate at each incident angle was measured under conditions that the incident angle of P-polarized light was equal to 0°, 30°, 50°, 56°, and 65°. A result is shown in Table 2.

<Evaluation of Polarization Axis Conversion Performance>

The average transmittance shown in Table 2 is an average transmittance in the visible light region of 400 nm to 700 nm. As described above, it can be determined that as the average transmittance is lower, the polarization axis conversion performance is more excellent. When the incident angle of P-polarized light incident on the optical laminate is in the range from not less than 45° to not more than 65°, the reflectance at the surface of the optical laminate can be theoretically suppressed to 2% or less. Therefore, when the angle θ formed by the slow axis of the half-wave plate and the polarization axis of P-polarized light incident to the optical laminate at incident angles of 50°, 56° and 65° is 35° and 40°, that is, in the range from not less than 35° to not more than 44°, it is understood that the half-wave plate can suppress high reflection of P-polarized light at the surface of the optical laminate while exhibiting excellent polarization axis conversion performance.

TABLE 2

EVALUATION RESULT OF POLARIZATION AXIS CONVERSION PERFORMANCE

|  |  | INCIDENT ANGLE OF P-POLARIZED LIGHT | | | | |
| --- | --- | --- | --- | --- | --- | --- |
|  |  | 0° | 30° | 50° | 56° | 65° |
| ANGLE θ FORMED BY SLOW AXIS OF HAIF-WAVE PLATE AND POLARIZATION AXIS OF P-POLARIZED LIGHT INCIDENT AT ARBITRARY INCIDENT ANGLE | 50° | 15.1% | 19.8% | 23.8% | 24.8% | 25.9% |
|  | 45° | 8.6% | 8.9% | 10.8% | 13.0% | 15.2% |
|  | 40° | 9.5% | 9.2% | 9.8% | 10.2% | 10.6% |
|  | 35° | 18.3% | 17.2% | 15.6% | 13.7% | 11.8% |
|  | 30° | 31.1% | 28.8% | 25.6% | 22.5% | 19.3% |

<Calculation of Higher Polarization Axis Conversion Performance>

From the following equations (2) and (3), the angle θ formed by the slow axis of the half-wave plate when the incident angle of P-polarized light to the optical laminate is 0°, 30°, 50°, 56°, and 65° and the polarization axis of P-polarized light incident at the above angles was determined. As a result, the value of θ was 45°, 43°, 41°, 40° and 39° for the incident angle of P-polarized light of 0°, 30°, 50°, 56° and 65°, respectively. Note that the refractive index of air was set to 1.00 and the refractive index of the half-wave plate was set to 1.55. From Table 2, when the incident angle of P-polarized light is 0° and 30°, the value of θ at the highest average transmittance is 45°, and when the incident angle of P-polarized light is 50°, 56° and 65°, the average transmittance is highest when the value of θ is 40°. That is, the polarization axis conversion performance of the half-wave plate is highest in the vicinity of the value of θ calculated from the following equations (2) and (3). Therefore, the polarization axis conversion performance of the half-wave plate can be further enhanced by strictly controlling the angle θ so as to satisfy the following equations (2) and (3).

$$\tan\theta = \cos\beta \quad (2)$$

$$\beta = \sin^{-1}\left(\sin\alpha \cdot \frac{n_\alpha}{n_\beta}\right) \quad (3)$$

θ: an angle formed by the slow axis of the half-wave plate and the polarization axis of S-polarized light or P-polarized light incident to the optical laminate at arbitrary incident angle α
α: an incident angle of S-polarized light or P-polarized light to the optical laminate
$n_\alpha$: refractive index of air
$n_\beta$: refractive index of the half-wave plate <Production of Head-Up Display and Evaluation of Display Image>

A head-up display was produced in an arrangement as shown in FIG. 2. Note that a liquid crystal projector as the light source 20 and a polarization plate as the polarization plate 30 were installed so that P-polarized light was emitted. The optical laminate produced in the example 1 was used as the optical laminate 4, and the optical laminate 4 was installed so that the angle θ formed by the slow axis of the half-wave plate and the polarization axis of P-polarized light incident to the optical laminate 4 was equal to 40°. Furthermore, the optical laminate 4 was installed so that the incident angle of P-polarized light to the optical laminate 4 was the Brewster's angle (about 560). Next, when a display image was projected from the liquid crystal projector to the optical laminate 4 in a dark room, no double image was observed in the display image. In addition, even when a display image was observed with commercially available polarization sunglasses (adsorbing S-polarized light) being worn, it was possible to visually recognize a display image which had high visibility and was very clear.

Example 2

A head-up display was produced in the same manner as the example 1 except that the optical laminate 4 was installed so that a polarization plate was installed as the polarization plate 30 so that S-polarized light was emitted, the angle θ formed by the slow axis of the half-wave plate and the polarization axis of S-polarized light incident to the optical laminate 4 was equal to 40°, and also the incident angle of S-polarized light to the optical laminate 4 was equal to the Brewster's angle (about 56°). When a display image was projected from the liquid crystal projector to the optical laminate 4 in a dark room, no double image was observed in the display image.

Example 3

A head-up display was produced in the same manner as the example 2 except that the optical laminate was installed such that the angle θ formed by the slow axis of the half-wave plate and the polarization axis of P-polarized light incident to the optical laminate was equal to 35°. When a display image was projected from the liquid crystal projector to the optical laminate in a dark room, no double image was observed in the display image.

Comparative Example 1

Evaluation was performed in the same manner as the example 1 except that the angle θ formed by the slow axis of the half-wave plate and the polarization axis of P-polarized light incident to the optical laminate 4 was changed to 50°. As a result, when a display image was projected from the liquid crystal projector to the optical laminate, the display image was dark as compared with the display image observed in the example 1, and the visibility was comprehensively low.

Example 4

<Preparation of Ultraviolet Curable Resin Coating Liquid for Forming Block Layer>

An coating liquid B of an ultraviolet curable resin composition having a composition shown in Table 3 was prepared.

TABLE 3

COMPOSITION TABLE OF COATING LIQUID B

| MATERIAL (KIND) | MATERIAL NAME (MANUFACTURER) | AMOUNT ADDED (PARTS) |
| --- | --- | --- |
| EPOXY ACRYLATE | R115 (NIPPON KAYAKU CO., LTD.) | 30 |
| ACRYLATE | PET30 (NIPPON KAYAKU CO., LTD.) | 10 |
| URETHANE ACRYLATE | PET30 I (NIPPON KAYAKU CO., LTD.) | 30 |
| PHOTOPOLYMERIZATION INITIATOR | Irgacure 907 (BASF LTD.) | 4 |
| PHOTOPOLYMERIZATION INITIATOR | Irgacure 184 (BASF LTD.) | 1 |
| SOLVENT | Methyl ethyl ketone | 25 |

<Production of Optical Laminate>

An optical laminate was produced in the same manner as the example 1 except that the following steps (3) and (4) were further added to the half-wave plate produced by the steps (1) and (2) described in the example 1. As a result, an optical laminate having a half-wave plate in which a block layer was formed on a side where a phase difference layer was present was produced.

<Production of Half-Wave Plate>

After the steps (1) and (2) described in the example 1, (3) the coating liquid B which was an ultraviolet curable resin composition for forming a block layer was coated on a polymerizable liquid crystal layer side of the half-wave plate at room temperature by using a wire bar so that the thickness of the block layer obtained after drying was 1.5 μm.

(4) The obtained coating film was heated at 40° C. for 1 minute to remove the solvent. Next, the coating film was subjected to UV irradiation with an output of 120 W by a high-pressure mercury lamp (manufactured by Harrison Toshiba Lighting Co., Ltd.) for 5 to 10 seconds to produce the half-wave plate having the block layer on the phase difference layer side.

Example 5

Polyvinyl butyral resin (Mowital B20H manufactured by Kuraray Co., Ltd.) was dissolved in methyl ethyl ketone so that a solid content thereof was equal to 30 wt %, and the obtained solution was coated on the block layer of the half-wave plate produced in the example 2 by a comma coater so that the thickness thereof after drying was equal to 100 μm. Next, the obtained coating film was dried at 80° C. for 3 minutes, and an intermediate film of coatable polyvinyl butyral resin was laminated on the block layer. One intermediate film made of polyvinyl butyral resin used in the examples 1 and 2 was placed on a surface of the support substrate side of the half-wave plate, and then pressurized and press-fitted by laminator to obtain an intermediate laminate. An optical laminate was produced in the same manner as the example 1 by using the obtained intermediate laminate. The phase difference value of the obtained optical laminate was equal to 252 nm at 546 nm.

Example 6

<Production of Half-Wave Plate in which ¾-Wave Plate and Quarter-Wave Plate are Laminated>

(1) The coating liquid A used in the example 1 was coated on the rubbing-processed surface of a PET film and adjusted in thickness by using a wire bar at room temperature so as to become a ¾-wave plate and a quarter-wave plate after drying.

(2) Each of the obtained coating films was heated at 50° C. for 2 minutes to remove the solvent, and then subjected to UV irradiation with an output of 120 W of the high pressure mercury lamp (manufactured by Harrison Toshiba Lighting Co., Ltd.) for 5 to 10 seconds to form each film having a phase difference layer including a polymerizable liquid crystal layer on the PET film.

(3) Next, the phase difference layers formed on these PET films were laminated with an acrylic adhesive so that the slow axis of the ¾-wave plate and the slow axis of the quarter-wave plate cross each other at 80°, thereby producing a half-wave plate having phase difference layers which are laminated so that the slow axes of the ¾-wave plate and the quarter-wave plate cross each other at 80°.

<Production of Optical Laminate>

(4) Only one PET film of the half-wave plate produced in the above step (3) was peeled off, and a block layer was formed on one surface of the phase difference layer by the same operation as the example 4.

(5) Furthermore, the other PET film was peeled off, and a block layer was also formed on the other surface of the phase difference layer by the same operation as the example 2, thereby forming the block layers on both surfaces of the phase difference layer in which the ¾-wave plate and the quarter-wave plate were formed.

(6) By using the half-wave plate in which the block layers were formed on both surfaces of the phase difference layer obtained in the above step (5), an intermediate laminate, and further an optical laminate was produced by the same operation as the example 1.

The PET films of the ¾-wave plate and the quarter-wave plate produced in the above step (2) were peeled off, and the phase difference values of the respective phase difference layers were measured by using the automatic birefringence meter used in the example 1. As a result, with respect to the phase difference layer of the ¾-wave plate, the phase difference value at 546 nm was 410 nm, and with respect to the phase difference layer of the quarter-wave plate, the phase difference value at 546 nm was 137 nm.

<Production of Head-Up Display and Evaluation of Display Image>

A head-up display shown in FIG. 2 was produced by the same operation as the example 1. Note that a liquid crystal projector as the light source 20 and a polarization plate as the polarization plate 30 were arranged in the display unit 2 so that S-polarized light was emitted. The optical laminate produced in the above step (6) was used as the optical laminate 4, and the optical laminate 4 was installed so that the angle θ formed by the slow axis of the ¾-wave plate constituting the laminated phase difference layer and the polarization axis of S-polarized light incident to the optical laminate 4 was equal to 40°. Furthermore, the optical laminate 4 was installed so that the incident angle of the S-polarized light to the optical laminate 4 was equal to the Brewster's angle (about 56°). Next, when a display image was projected from the liquid crystal projector to the optical laminate 4 in a dark room, no double image was observed even when the display image was displayed with any color, and an extremely clear display image could be visually recognized.

Example 7

The same operation as the example 6 was carried out except that the ¾-wave plate and the quarter-wave plate were laminated such that the slow axes thereof crossed each other at 70° to sequentially produce the half-wave plate having the phase difference layer formed by laminating the ¾-wave plate and the quarter-wave plate so that the slow axes thereof crossed at 70°, the intermediatelaminate, and the optical laminate.

A head-up display was produced in the same manner as the example 6 except that the angle θ formed with the polarization axis of S-polarized axis was equal to 35°, the incident angle of the S-polarized light was equal to the Brewster's angle (about 56°), and the optical laminate was installed such that the angle θ formed by the slow axis of the ¾-wave plate of the optical laminate and the polarization axis of S-polarized light incident to the optical laminate was equal to 35°. When a display image was projected with the obtained head-up display as in the case of the example 6, no double image was observed even what the display image was displayed with any color, and a clear display image was visually recognized.

Example 8

<Production of Half-Wave Plate Having Support Substrate in which ¾-Wave Plate and Quarter-Wave Plate are Laminated>
(1) By using a uniaxially stretched PET film serving as a support substrate and a block layer, a ¾-wave plate oriented in a direction inclined by 40° with respect to the slow axis direction of the PET film, and a quarter-wave plate oriented in a direction inclined by 40° with respect to the slow axis direction of the PET film were produced by the same operation as the example 6.
(2) Next, these PET films were laminated by using a pressure-sensitive acrylic adhesive so that the slow axe directions of the PET films are parallel to each other, and the phase difference layer of the ¾-wave plate and the phase difference layer of the quarter-wave plate which were formed on the respective PET films were opposite to each other, thereby producing a half-wave plate having a phase difference layer in which the ¾-wave plate and the quarter-wave plate were laminated so that the slow axes of the respective PET films thereof were parallel to each other.
<Production of Optical Laminate>
(3) An intermediate laminate and further an optical laminate were produced by the same operation as the example 6 without peeling off the PET films of the half-wave plate produced in the step (2).
<Production of Head-Up Display and Evaluation of Display Image>
A head-up display shown in FIG. 2 was produced by the same operation as the example 1. A liquid crystal projector as the light source 20 and a polarization plate as the polarization plate 30 were installed in the display 2 so that S-polarized light was emitted. The optical laminate produced by the above-described step (3) was used as the optical laminate 4, and the optical laminate 4 was installed so that the angle θ formed by the slow axis of the ¾-wave plate constituting the laminated phase difference layer and the polarization axis of S-polarized light incident to the optical laminate 4 was equal to 40°. At the same time, the slow axis of the uniaxially stretched PET film was 90° with respect to the incident S-polarized light. Furthermore, the optical laminate 4 was arranged such that the incident angle of S-polarized light to the optical laminate 4 was equal to the Brewster's angle (about 56°). Next, when a display image was projected from the liquid crystal projector to the optical laminate 4 in a dark room, no double image was observed even when the display image was displayed with any color, and an extremely clear display image could be visually recognized.

Comparative Example 2

An optical laminate was produced in the same manner as the example 4 except that no block layer was formed on the half-wave plate. The phase difference value of the obtained optical laminate was equal to 252 nm at 546 nm.
<Evaluation of Heat Resistance of Half-Wave Plate>
Initial phase difference values at 546 nm of the optical laminate obtained in the examples 4 and 5 and the comparative example 2 were measured with an automatic birefringence meter ("KOBRA-21ADH" manufactured by Oji Scientific Instruments). Moreover, these optical laminate were left to stand under a high-temperature atmosphere of 100° for 500 hours, and the variation rates of the phase difference values before and after leaving-to-stand were measured. A result is shown in Table 4. The variation rates of the phase difference values are values determined as follows.

Variation rate (%)={(phase difference value after 500 hours at 100° C.)−(initial phase difference value)}×100/initial phase value

TABLE 4

EVALUATION RESULT OF HEAT RESISTANCE

| | INITIAL PHASE DIFFERENCE VALUE (nm) | PHASE DIFFERENCE VALUE AFTER 500 HOURS AT 100° C. (nm) | VARIATION RATE (%) |
|---|---|---|---|
| EXAMPLE 4 | 252 | 251 | −0.4 |
| EXAMPLE 5 | 252 | 249 | −1.4 |
| COMPARATIVE EXAMPLE 2 | 252 | 142 | −43.5 |

From Table 4, with respect to the optical laminates each having the block layer produced in the examples 4 to 5, it is apparent that the variation of the phase difference value under a high temperature atmosphere can be greatly suppressed as compared with the optical laminate having no block layer produced in the comparative example 1.

According to the present disclosure, it is possible to provide a head-up display system which enables a display image to be clearly visually recognized and exhibits excellent polarization axis conversion performance. Particularly, in the case of making P-polarized light incident, even when an observer wears polarization sunglasses, a display image can be clearly visually recognized. The head-up display system of the present disclosure can be suitably used as a windshield, side glass, rear glass, roof glass of various automobiles, and also suitably used as a window for railway vehicles, ships, aircrafts, and further a window material for building materials and industries, and can be expected to be applied in any fields.

Furthermore, the half-wave plate has the block layer, which makes it possible to provide a head-up display system which is excellent in heat resistance, has little variation in phase difference value of the half-wave plate under a high temperature atmosphere, and stably maintains optical performance.

What is claimed is:

1. A head-up display system comprising:
an optical laminate having at least one substrate material and a half-wave plate; and
a display unit that makes display light representing a display image into S-polarized light or P-polarized light and emits the S-polarized light or the P-polarized light,
wherein an angle formed by a polarization axis of the S-polarized light or the P-polarized light incident from a position inclined at not less than 45° and not more than 65° with respect to an axis perpendicular to a surface of the optical laminate and a slow axis of the half-wave plate is not less than 35° and not more than 44°,
and
an incident angle of the P-polarized light incident to the optical laminate is within a range from not less than α−10° to not more than α+10°, where α represents a Brewster's angle of the P-polarized light with respect to the optical laminate.

2. The head-up display system according to claim 1, wherein a range of an angle θ formed by the slow axis of the half-wave plate and a polarization axis of S-polarized light or P-polarized light incident onto the optical laminate at arbitrary incident angle is in a range of ±7° of values calculated from the following equations (2) and (3):

$$\tan\theta = \cos\beta \quad (2)$$

$$\beta = \sin^{-1}\left(\sin\alpha \cdot \frac{n_\alpha}{n_\beta}\right) \quad (3)$$

θ: an angle formed by the slow axis of the half-wave plate and the polarization axis of S-polarized light or P-polarized light incident to the optical laminate at arbitrary incident angle α
α: an incident angle of S-polarized light or P-polarized light to the optical laminate
$n_\alpha$: refractive index of air
$n_\beta$: refractive index of the half-wave plate.

3. The head-up display system according to claim 1, wherein an angle θ formed by the slow axis of the half-wave plate and a polarization axis of S-polarized light or P-polarized light incident onto the optical laminate at arbitrary incident angle satisfies the following equations (2) and (3):

$$\tan\theta = \cos\beta \quad (2)$$

$$\beta = \sin^{-1}\left(\sin\alpha \cdot \frac{n_\alpha}{n_\beta}\right) \quad (3)$$

θ: an angle formed by the slow axis of the half-wave plate and the polarization axis of S-polarized light or P-polarized light incident to the optical laminate at arbitrary incident angle α
α: an incident angle of S-polarized light or P-polarized light to the optical laminate
$n_\alpha$: refractive index of air
$n_\beta$: refractive index of the half-wave plate.

4. The head-up display system according to claim 1, wherein the half-wave plate has a phase difference layer formed by laminating a ¾-wave plate and a quarter-wave plate so that the slow axes of the ¾-wave plate and the quarter-wave plate intersect with each other.

5. The head-up display system according to claim 1, wherein the half-wave plate has a block layer on a side where a phase difference layer having a function of converting a polarization axis is present.

6. The head-up display system according to claim 5, wherein the block layer is a cured film obtained by curing an ultraviolet curable resin composition, a thermosetting resin composition, or a mixture thereof.

7. The head-up display system according to claim 6, wherein the ultraviolet curable resin composition contains one or more kinds of ultraviolet curable resin selected from the group consisting of polyfunctional (meth)acrylate, polyfunctional urethane (meth)acrylate, polyfunctional epoxy (meth)acrylate, polyfunctional polyester (meth)acrylate and polyfunctional tris (acryloxyethyl)isocyanurate.

8. The head-up display system according to claim 1, wherein the optical laminate has an intermediate laminate in which the half-wave plate is sandwiched by two intermediate films, and the intermediate laminate is sandwiched by two substrate materials.

9. The head-up display system according to claim 8, wherein at least one intermediate film of the two intermediate films is a film which is directly laminated on the substrate material in advance.

10. The head-up display system according to claim 1, wherein the substrate material is glass.

11. The head-up display system described in claim 1, wherein the half-wave plate includes a polymerizable liquid crystal layer.

12. The head-up display system according to claim 11, wherein the polymerizable liquid crystal layer is provided on a support substrate that is subjected to orientation processing.

* * * * *